United States Patent [19]
Brost et al.

[11] Patent Number: 5,856,924
[45] Date of Patent: Jan. 5, 1999

[54] PROCESSOR AND METHOD FOR DEVELOPING A SET OF ADMISSIBLE FIXTURE DESIGNS FOR A WORKPIECE

[76] Inventors: Randolph C. Brost, 4204 Landau NE., Albuquerque, N. Mex. 87111; Kenneth Y. Goldberg, 1006 W. Edgeware Rd., Los Angeles, Calif. 90026; John Canny, Computer Science Division, 529 Soda Hall, UC Berkeley, Calif. 94720-1776; Aaron S. Wallack, 244 Wilson Way, Albany, Calif. 94710

[21] Appl. No.: 430,884

[22] Filed: Apr. 28, 1995

Related U.S. Application Data

[63] Continuation-in-part of Ser. No. 239,382, May 6, 1994, abandoned.

[51] Int. Cl.$^6$ .............................. G06F 19/00; G06G 7/66
[52] U.S. Cl. .................. 364/474.24; 364/474.01; 364/474.73; 364/552; 364/551.02; 269/45; 269/66; 269/296; 269/281; 483/20; 483/24; 483/19; 483/44
[58] Field of Search ...................... 364/474.24, 474.01, 364/474.73, 552, 551.02; 408/108; 269/45, 66, 296, 281; 335/286, 287; 483/20, 24, 28, 19, 44

[56] References Cited

U.S. PATENT DOCUMENTS

| | | | |
|---|---|---|---|
| 4,519,592 | 5/1985 | Russel | 269/25 |
| 4,640,501 | 2/1987 | Poland | 269/21 |
| 4,794,687 | 1/1989 | Peters et al. | 29/559 |
| 4,901,990 | 2/1990 | Frechette | 269/25 |
| 5,239,739 | 8/1993 | Akeel et al. | 29/430 |
| 5,278,953 | 1/1994 | Saxon et al. | 395/349 |
| 5,308,010 | 5/1994 | Hakiel | 242/534 |
| 5,321,351 | 6/1994 | Swart et al. | 342/758 |
| 5,343,611 | 9/1994 | Lager et al. | 29/559 |
| 5,408,189 | 4/1995 | Swart et al. | 324/758 |

*Primary Examiner*—Reba I. Elmore
*Assistant Examiner*—McDieunel Marc

[57] ABSTRACT

Methods and apparatus are provided for developing a complete set of all admissible Type I and Type II fixture designs for a workpiece. The fixture processor generates the set of all admissible designs based on geometric access constraints and expected applied forces on the workpiece. For instance, the fixture processor may generate a set of admissible fixture designs for first, second and third locators placed in an array of holes on a fixture plate and a translating clamp attached to the fixture plate for contacting the workpiece. In another instance, a fixture vise is used in which first, second, third and fourth locators are used and first and second fixture jaws are tightened to secure the workpiece. The fixture process also ranks the set of admissible fixture designs according to a predetermined quality metric so that the optimal fixture design for the desired purpose may be identified from the set of all admissible fixture designs.

53 Claims, 19 Drawing Sheets

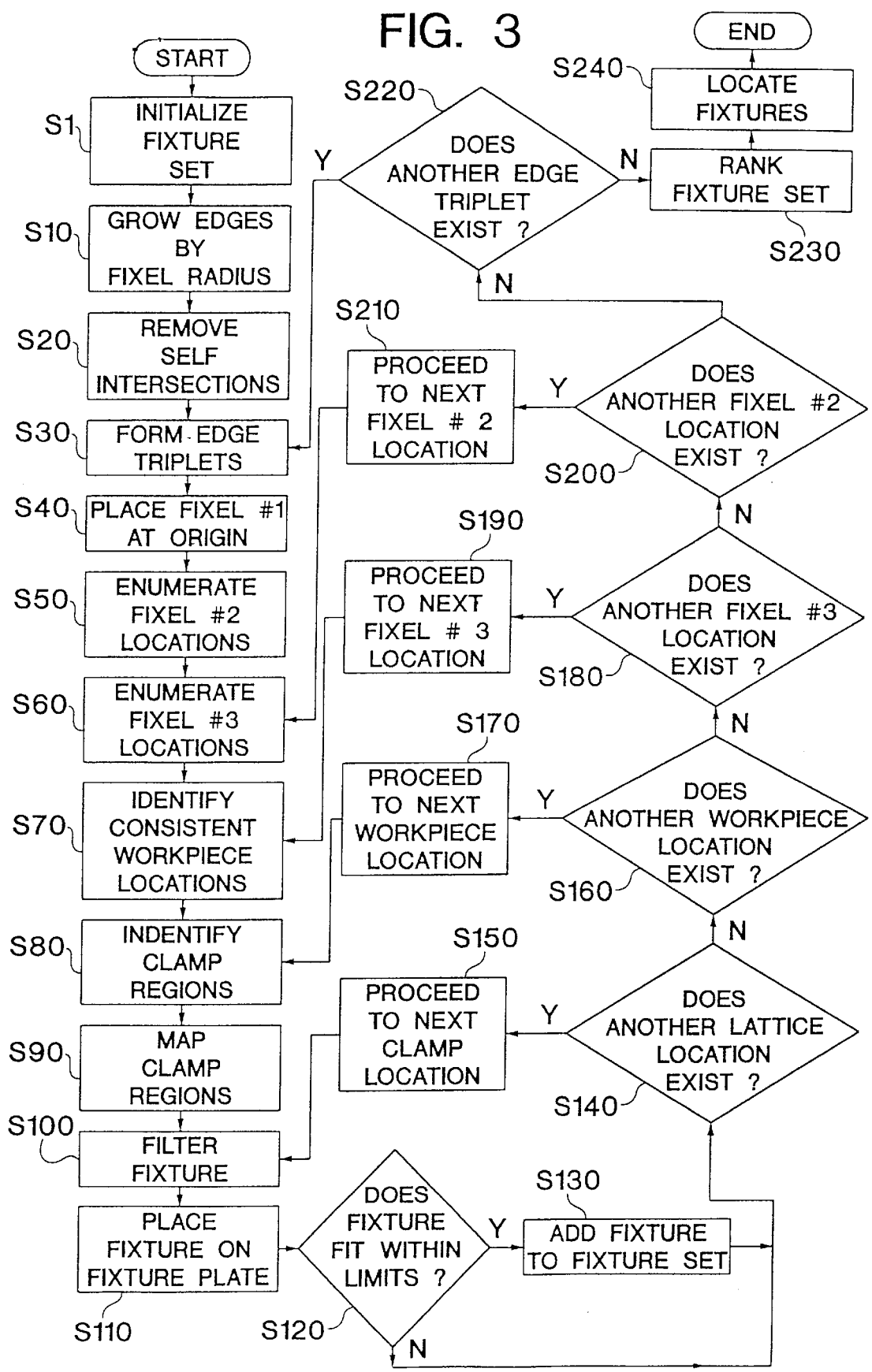

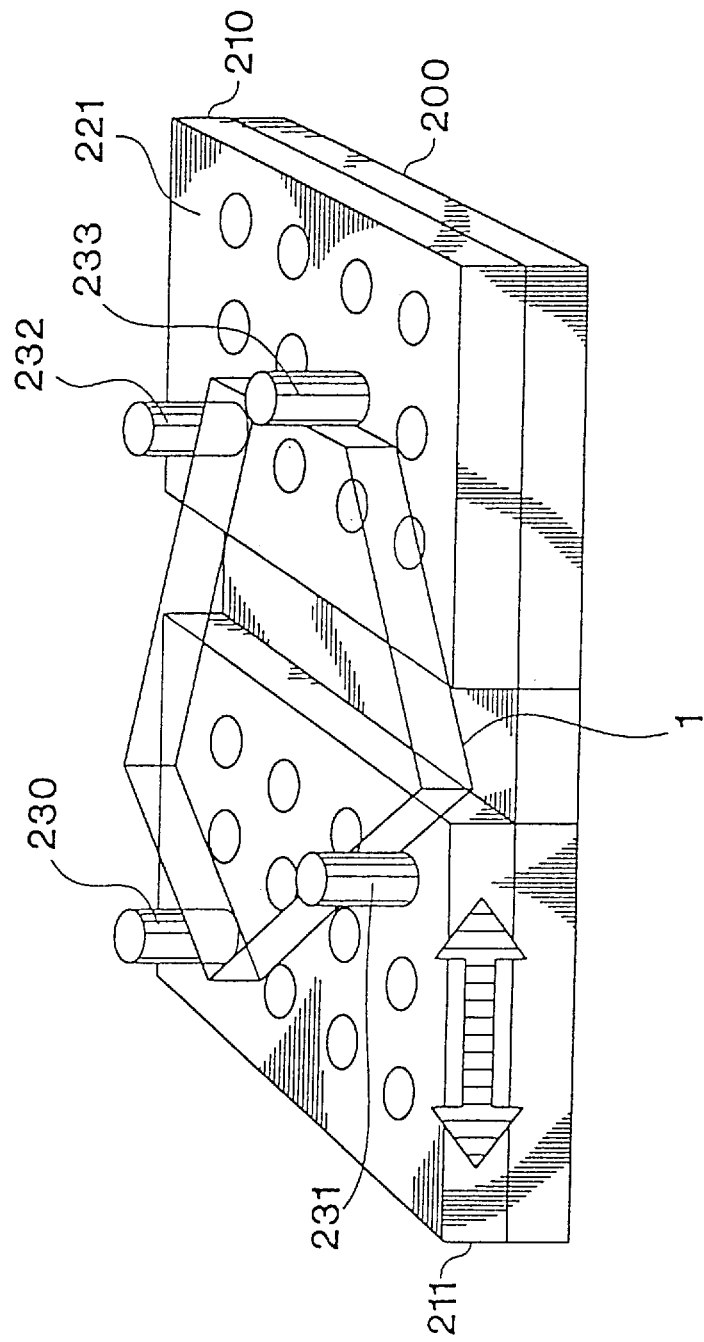

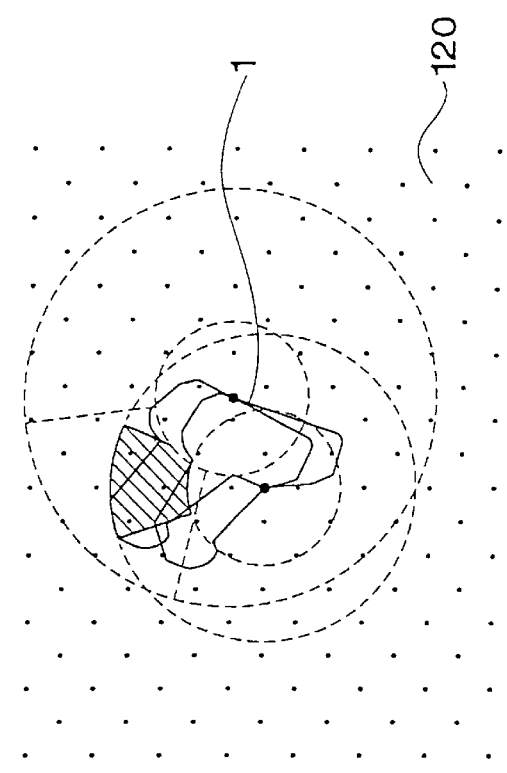
FIG. 6c
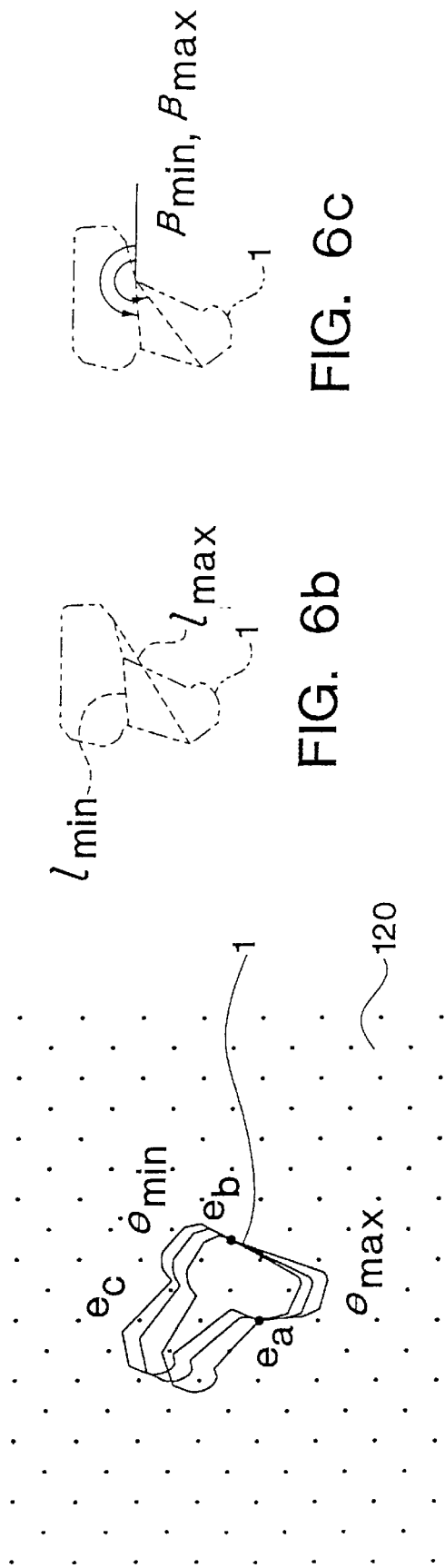
FIG. 6b
FIG. 6a
FIG. 6e
FIG. 6d

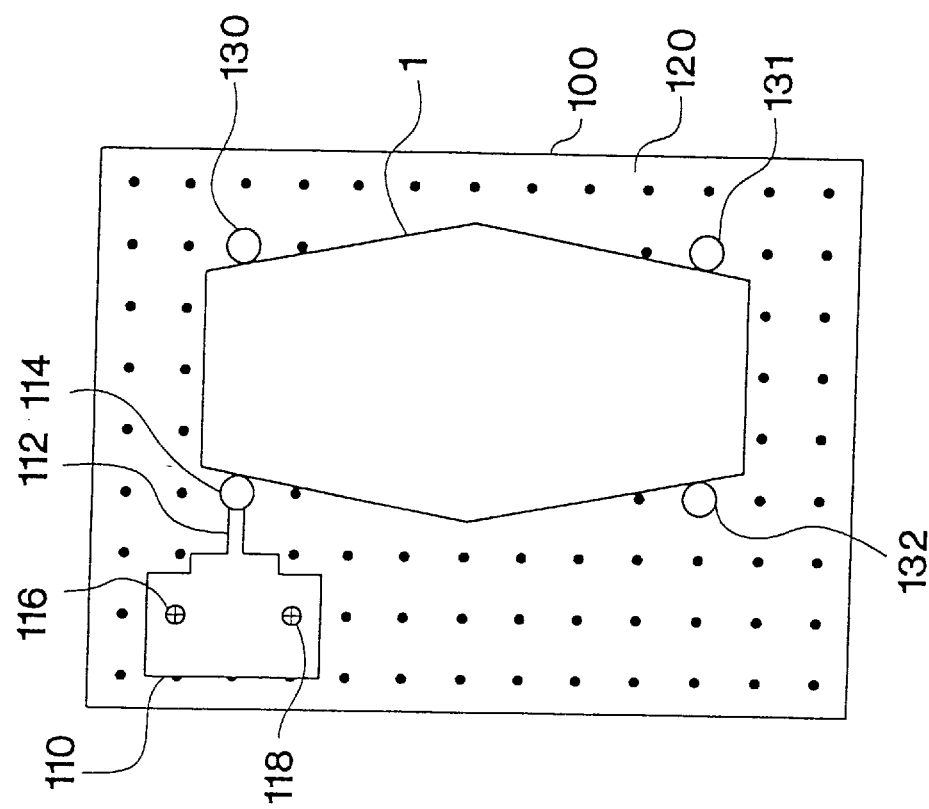
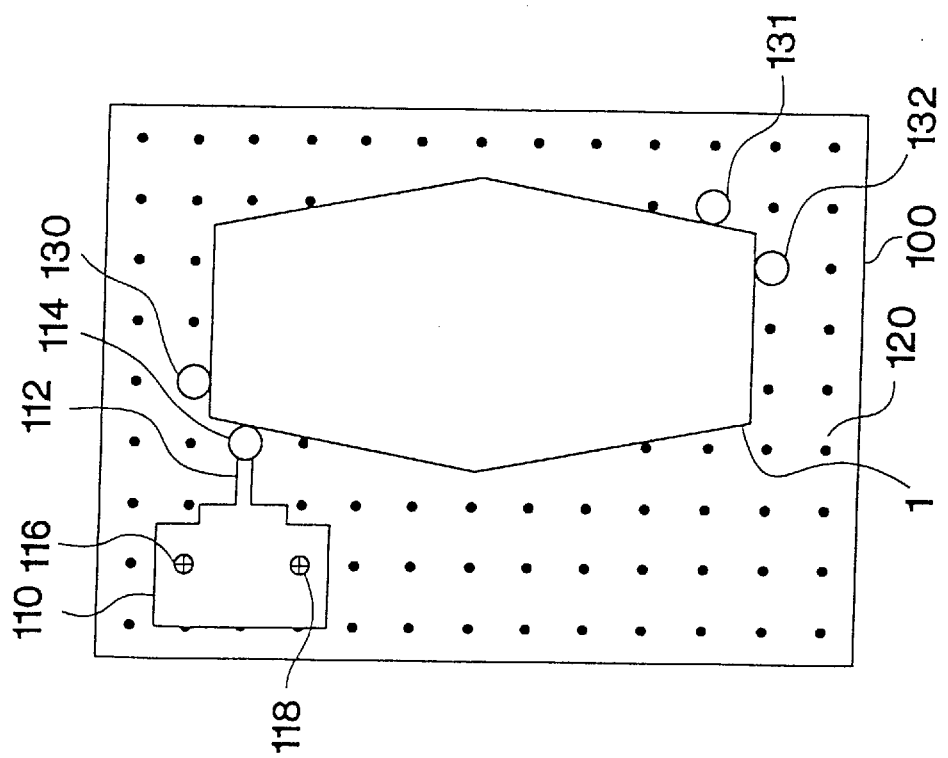

POSITIONS OF $F_2$

PROCESSOR AND METHOD FOR DEVELOPING A SET OF ADMISSIBLE FIXTURE DESIGNS FOR A WORKPIECE

RELATED APPLICATION

This is a continuation-in-part of U.S. application Ser. No. 08/239,382, entitled "Processor and Method of Developingg a Set of Admissible Fixture Designs for a Workpiece", filed on May 6, 1994. Now abandoned on Jun. 23, 1995.

GOVERNMENT RIGHTS

The government has rights in this invention pursuant to Contract No. DE-ACO4-76-DP00789 awarded by the U.S. Department of Energy.

BACKGROUND OF THE INVENTION

1. Technical Field Of The Invention

The present invention is a continuation of U.S. application Ser. No. 08/239,382 filed May 6, 1994, which is directed to systems and methods for developing a set of modular fixture designs for a workpiece and, more particularly, the present invention is directed to developing the set of all admissible fixture designs that exists and finding the optimal fixture design based on a user defined quality metric.

2. Description Of Related Art

Currently, for automated manufacturing assembly and inspection operations, which require fixtures to locate and hold workpieces, design fixtures for the shape, position and orientation of the workpiece are generally custom designed by manufacturing engineers and machinists. Presently, general guidelines, such as the 3-2-1 rule, are used and processes for automatically developing design fixtures based on CAD workpiece models are still lacking. The absence of automated design fixture systems is largely due to the large amount of alternative fixture designs that must be considered in most cases. Modular fixture systems are known that typically include a square lattice of tapped and dowel holes with spacings tolerance to ±0.002 inches and an assortment of precision locating and clamping elements that can be rigidly attached to the lattice using dowel pins or expanding mandrels. Such modular fixture systems greatly reduce the number of alternatives but human intuition and trial and error techniques are still necessary to design the modular fixture. Furthermore, in the present modular fixturing systems, an acceptable design may not be found or a sub-optimal fixture design may be used because a complete set of all admissible fixture designs are not systematically considered.

Known processes find a set of four (seven) independent regions on the boundary of a polygon (polyhedron) such that a frictionless contact applied to each region is guaranteed to provide form closure, which is a kinematic constraint condition that prevents motion of the workpiece. The set of four or seven independent regions are useful because of uncertainties in the pose of the workpiece before grasping is allowed. It is also known that comparable regions on a polygon can be found by using linear optimization with three frictional contacts in the plane. Also, processing for re-orienting a polygon through a series of form closure grasping operations is known.

Further methods for analyzing the performance of a given fixture have also been analyzed. An Automatically Reconfigurable Fixture (ARF) system automatically synthesizes and constructs work holdings consisting of modular fixtures and determines whether a given fixture and design provides total constraint of a rigid body as well as loading accessibility before clamping. However, the ARF system fails to consider geometric access constraints in addition to kinematic closure.

A method of evaluating the degree of motion constraint imposed by seven fixels (fixture elements which refer to either a locator or a clamp on a fixture plane) contacting a three dimensional rigid body is also known. In this method, an extension of screw theory is applied based on motion stops for producing a metric estimate of the quality of the kinematic constraint of a given fixture design. However, a quality metric based on a user specified set of expected applied forces is not provided by this method.

It is desired to provide an automatic fixture design system which explicitly considers the entire process plan as well as non-geometric effects such as part deformation, tolerances, the release of internal stress during machining and the ability to flush away chips during cutting for example. The present invention is directed to providing a complete system and method that develops all admissible design fixtures so that the fixture design best satisfying the kinematic closure and geometric access constraints may be selected.

SUMMARY OF THE INVENTION

One object of the present invention is directed to providing systems and methods for automatically generating all of the admissible fixture designs for a desired workpiece if any exists.

A further object of the present invention is directed to a system and method which develops the optimal fixture from the set of admissible fixture designs developed based on geometric access constraints.

A further object of the present invention is directed to a system and method which develops the optimal fixture from the set of admissible fixture designs developed based on geometric access constraints and expected applied forces on the workpiece.

A further object of the present invention is to provide a system and method which ranks all of the admissible design fixtures based on a predetermined quality metric.

The objects of the present invention are fulfilled by providing a modular fixturing system comprising a fixture plate including an array of holes separated by a predetermined spacing for placing first, second and third locators thereon, a translating clamp attached to the fixture plate for contacting a workpiece between the first, second and third locators and the translating clamp, and a fixture processor for generating a set of admissible fixture designs which provide form closure based on geometric access constraints of the workpiece.

The fixture processor of the modular fixturing system further comprises input means for inputting a geometric representation of the workpiece, triplet determining means for generating sets of the array of holes on the fixture plate of the first, second and third locators, clamp enumerating means for generating positions of the translating clamp on the fixture plate, corresponding to the sets of the array of holes which provide form closure within the geometric access constraints for the workpiece, and fixture filtering means for checking clamp locations and clamp travel limits of the translating clamp and determining whether each of the sets of the array of holes and the corresponding positions of the translating clamp will fit on the fixture plate for obtaining the set of admissible fixture designs. The fixture processor further comprises ranking means for ranking the set of admissible fixture designs according to a predetermined quality metric for the workpiece which allows the set of admissible fixture designs to be ranked by estimating a maximum contact reaction force required to resist the expected applied forces. The fixture processor further comprises mapping means for mapping the set of admissible fixture designs onto the fixture plate.

The objects of the present invention are also fulfilled by providing a modular fixture design processor for developing a set of admissible fixture designs on a fixture plate where a workpiece with first, second and third locators and a translating clamp, comprising input means for inputting a geometric representation of the workpiece, and a fixture processor for generating a set of admissible fixture designs for the geometric representation of the workpiece based on geometric access constraints of the workpiece.

The modular fixture design processor develops the set of admissible fixture designs for a desired type of fixture. The desired type of fixture comprises form closure, force closure, simple locating and redundantly constrained. Each type of these fixtures has an associated number of contact points and force opposition requirements. For example, the form closure fixture resists all applied disturbances without relying on friction, the force closure fixture relies on friction to resist some disturbance forces, the simple locating fixture resists a limited set of disturbance forces but not necessarily all applied disturbances, and the redundantly constrained fixture contains extra supports and clamps to prevent deformation of the part under the application of large forces.

The objects of the present invention are further fulfilled by providing a method for developing a set of admissible fixture designs on a fixture plate for a workpiece with first, second and third locators and a translating clamp, comprising the steps of inputting a geometric representation of the workpiece, and generating the set of admissible fixture designs for the geometric representation of the workpiece which provides form closure based on geometric access constraints of the workpiece.

The objects of the present invention are also fulfilled by providing a method for developing a set of admissible fixture designs on a fixture plate for a workpiece for first, second and third locators and a translating clamp, comprising the steps of inputting a geometric representation of the workpiece, generating sets of the first, second and third locators on the fixture plate for the workpiece, generating positions for the translating clamp on the fixture plate corresponding to the sets of the first, second and third locators which provide form closure based on geometric access constraints of the fixture plate, checking clamp locations and clamp travel limits of the translating clamp, and determining whether the sets of the first, second and third locators and the corresponding positions of the translating clamp will fit on the fixture plate for obtaining the set of admissible fixture designs.

The objects of the present invention are further achieved by providing a modular fixture system comprising a fixture vise having first and second fixture jaws capable of being translated in a planar direction, said first and second fixture jaws including an array of holes separated by a predetermined distance for placing first, second, third and fourth locators therein which contact a workpiece; and a fixture processor for generating a set of admissible fixture designs which provide form closure based on geometric access constraints of said workpiece.

The objects of the present invention are additionally achieved by providing a modular design fixture processor for developing a set of admissible fixture designs on a fixture vise for a workpiece with first, second, third and fourth locators, said fixture vise including first and second fixture jaws capable of being translated in a planar direction, said first and second fixture jaws including an array of holes separated by a predetermined distance for placing first, second, third and fourth locators therein which contact said workpiece, said processor comprising first enumerating means for enumerating positions on said first fixture jaw for said first locator and said second locator; bounding means for determining a boundary constraint indicative of limits on possible third and fourth locator positions based on one set of first and second locator positions; second enumerating means for enumerating positions on said second fixture jaw for said third locator and said fourth locator based on said boundary constraint; pose enumerating means for enumerating poses of said workpiece based on one set of said first, second, third, and fourth locator positions; and analyzing means for determining whether said set of said first, second, third and fourth locator positions and one of said poses of said workpiece form a fixture design achieving form closure.

The objects of the present invention are also achieved by providing a modular design fixture processor for developing a set of admissible fixture designs on a fixture vise-for a workpiece with first, second, third and fourth locators, said fixture vise including first and second fixture jaws disposed thereon which are capable of being translated in a planar direction, said first and second fixture jaws including an array of holes separated by a predetermined distance for placing at least first, second, third and fourth locators therein which contact a workpiece, said processor comprising first enumerating means for enumerating positions on said first fixture jaw for said first, second and third locator; pose enumerating means for enumerating poses of said workpiece such that edges of said workpiece simultaneously contact said first, second and third locator based on one set of said first, second, and third locator positions; and second enumerating means for enumerating positions of said fourth locator on said second fixture jaw based on said one set of said first, second and third locator positions and one of said poses of said workpiece; and analyzing means for determining whether said set of said first, second, third and fourth locator positions and said one of said poses of said workpiece form a fixture design achieving form closure.

The objects of the present invention are additionally achieved by providing a method of designing modular fixtures, comprising (a) providing a fixture vise with first and second fixture jaws which are capable of being translated in a planar direction, said first and second fixture jaw including an array of holes separated by a predetermined distance for placing first, second, third and fourth locators therein which contact a workpiece; and (b) generating a set of admissible fixture designs which provide form closure based on geometric access constraints of said workpiece.

The objects of the present invention are additionally achieved by providing a method for developing modular fixtures on a fixture vise for a workpiece with first, second, third and fourth locators, said fixture vise including first and second fixture jaws which are capable of being translated in a planar direction, said first and second fixture jaws including an array of holes separated by a predetermined distance for placing first, second, third and fourth locators therein which contact said workpiece, comprising (a) enumerating positions on said first fixture jaw for said first locator and said second locator; (b) determining a boundary constraint indicative of limits on possible third and fourth locator positions based on one set of first and second locator positions; (c) enumerating positions on said second fixture jaw for said third locator and said fourth locator based on output of step (b) ; (d) enumerating poses of said workpiece based on one set of said first, second, third, and fourth locator positions; and (e) determining whether said set of said first, second, third and fourth locator positions and one of said poses of said workpiece form a fixture design achieving form closure.

The objects of the present invention are also achieved by providing a method for developing modular fixtures on a fixture vise for a workpiece with first, second, third and fourth locators, said fixture vise including first and second fixture jaws disposed thereon which are capable of being translated in a planar direction, said first and second fixture jaws including an array of holes separated by a predetermined distance for placing first, second, third and fourth locators therein which contact said workpiece, comprising (a) enumerating positions on said first fixture jaw for said first, second and third locator; (b) enumerating poses of said workpiece such that edges of said workpiece simultaneously contact said first, second and third locator based on one set of said first, second, and third locator positions; (c) enumerating positions of said fourth locator on said second fixture jaw based on said one set of said first, second and third locator positions and one of said poses of said workpiece; and (d) determining whether said set of said first, second, third and fourth locator positions and said one of said poses of said workpiece form a fixture design achieving form closure.

The system, processor and method for the embodiments of the present invention are able to find an admissible fixture design if one exists by completely and systematically analyzing the complete set of admissible fixture designs. Thereby, the use of a sub-optimal fixture design may be avoided and the optimal fixture design according to a predetermined quality metric will be achieved.

Further scope of applicability of the present invention will become apparent from the detailed description given hereinafter. However, it should be understood that the detailed description and specific examples, while indicating preferred embodiments of the invention, are given by way of illustration only, since various changes in modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 3 illustrates a flow chart for the fixture processor in an embodiment of the present invention;

FIGS. 4(a) and 4(b) illustrates a fixture vise systems for other embodiments of the present invention;

FIGS. 6(a), 6(b), 6(c), 6(d) and 6(e) illustrate the process for determining candidate locations for a third fixel of a workpiece;

FIGS. 11(a) and 11(b) illustrate two different fixture designs that provide form closure for ranking comparison;

PREFERRED EMBODIMENTS OF THE PRESENT INVENTION

Figure 1:
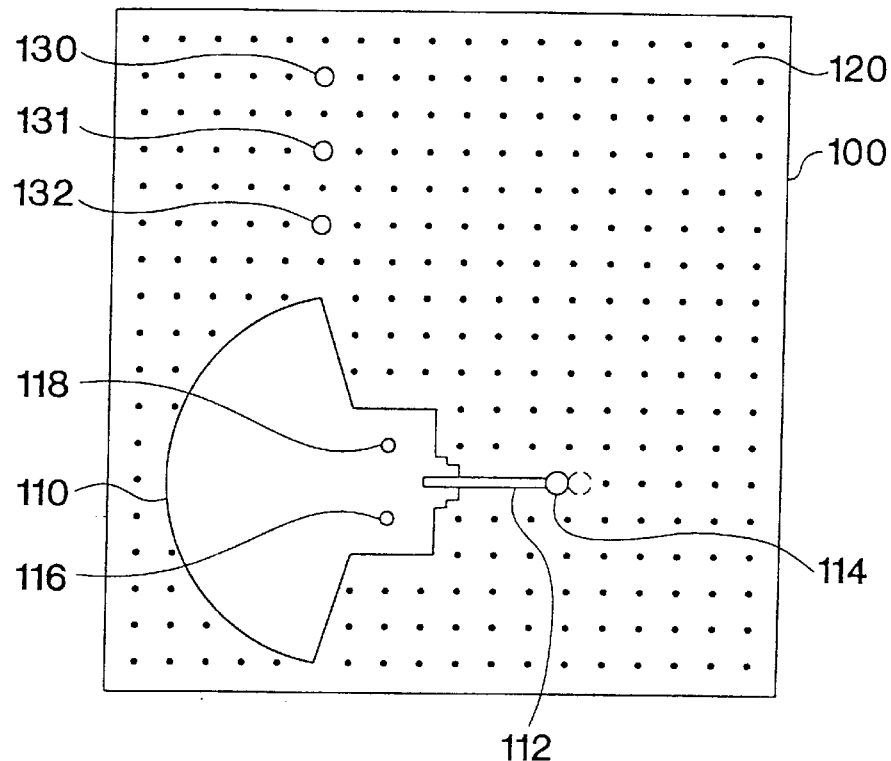
FIG. 1 illustrates a fixture plate system for one embodiment of the present invention.
Figure 2:
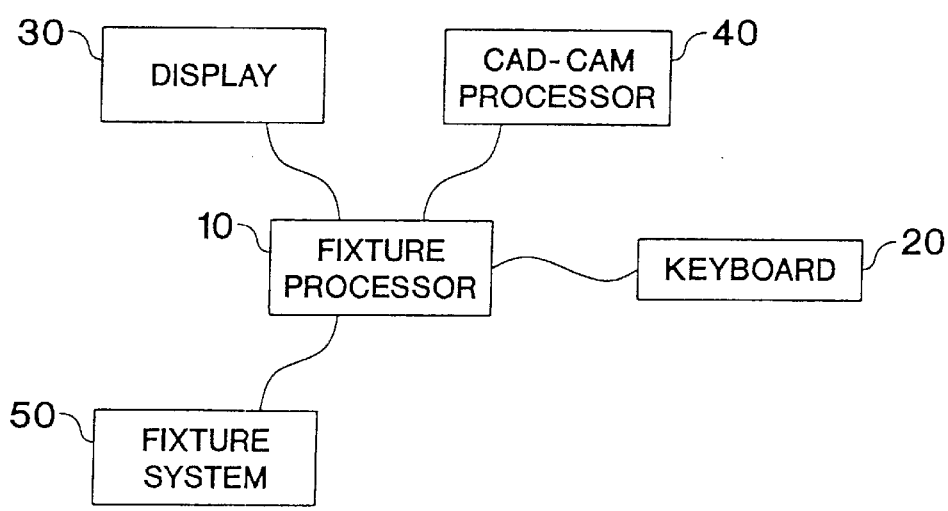
FIG. 2 illustrates a block diagram for the system in an embodiment of the present invention.

The first embodiment of the present invention will be discussed with references to FIGS. 1 through 3. FIG. 1 illustrates a fixture plate 100 including an array of precisely machined alternating dowel/threaded holes 120, a set of three round locators 130, 131 and 132 and a manually actuated translating clamp 110. The translating clamp 110 includes a clamp plunger 112 having a cylindrical clamp tip 114 and unit spaced connectors 116 and 118. As illustrated in FIG. 2, the modular fixturing system for the first embodiment of the present invention includes a fixture processor 10 for developing a set of admissible fixture designs for a workpiece, a keyboard 20 for inputting information to the fixture processor 10, such as the geometric representation of the workpiece, geometric access constraints and expected applied forces on the workpiece, etc., a display 30 which displays the admissible fixture designs developed by the fixture processor 10 along with the necessary information input thereto, a CAD-CAM processor 40 for inputting information such as geometric access constraints and expected applied forces based on an algorithm and a fixture system 50 which may be positioned responsive to the fixture processor 10. In one example of the present embodiment, a Symbolic XL-1201 Lisp machine is used for the fixture processor 10, the keyboard 20 and the display 30. In another example, a SPARC 10 running solaris or Sun OS/4 is used for the fixture processor 10, the keyboard 20, and the display 30.

Before discussing the processing performed by the fixture processor 10, background information and terms will be discussed in order to insure an understanding of the processing.

The fixture designs prevent a workpiece from translating and rotating on the fixture plane by providing four contacts with the edges of the projected boundary of the workpiece. In one embodiment, the four contacts are provided by the three round locators 130, 131 and 132 and translating clamp 110. The three round locators 130, 131 and 132 are each centered on one of the array holes 120. One of the array holes 120 and the translating clamp 110 that is attached to the fixture plate by a pair of unit spaced connectors 116 and 118 through two of the array holes 120 allows contact at a variable distance along the principal axes of the fixture plate. The term "fixel" (fixture element) is used to refer to either one of the locators 130, 131 and 132 or the translating clamp 110 and the term "fixture" is used to refer to a geometric arrangement of the three locators 130, 131 and 132 and the translating clamp 110 on the fixture plate 100.

An acceptable fixture design must satisfy several requirements. First, the fixture design must fully constrain the part to prevent any motion. Since kinematic constraints may reliably resist arbitrarily applied forces, fixtures are required to provide form closure which is a kinematic constraint condition that prevents all motion. In addition to constraining the part, the fixture must not interfere with certain geometric regions due to cosmetic surfaces by the need to retain clearance for grasping, machining, assembly or other operations on the workpiece. Thereby, geometric access constraints define regions of points that must remain free of fixture components. Accordingly, a fixture is admissible if form closure is provided and the geometric access constraints are provided.

The set of admissible fixture designs may be constructed by first characterizing the type of fixture desired. The type of desired fixtures include either form closure, force closure, simply locating, or redundantly constrained. Each type of fixture has an associated number of contact points and force opposition requirements. For example, the form closure fixture can resist all applied disturbances without relying on friction. The force closure fixture may rely on friction to resist some disturbance forces. The simple locating fixture is able to resist a limited set of disturbance forces but may not necessarily resist all applied disturbances. The redundantly constrained fixture obtains extra supports and clamps to prevent deformation of the workpiece under the application of large forces. Upon specifying the type of desired fixture design, the fixture processor 10 generates all of the admissible fixtures within the class of fixtures.

FIRST METHOD OF OPERATION

A general description for this first process performed by the fixture processor 10 will be provided before specifically discussing the process illustrated in the flow chart of FIG. 3. The process begins with a geometric formation that expands the projected workpiece boundary by the radius of the locators 130, 131 and 132 for allowing the locators 130, 131, and 132 to be treated as points on the transformed edges. The edges are then trimmed to respect geometric access constraints. Next, all locator set-ups that are possible for the transformed edges are enumerated. A locator set-up is defined by three locator positions and an (x, y, θ) configuration where the workpiece contacts all three locators 130, 131 and 132. There are a finite number of possible locator set-ups and each of these set-ups is passed to a form closure analysis.

For each locator set-up, the form closure analysis characterizes the motion constraints imposed by the locator set-up and then identifies the set of all points along the perimeter of the workpiece where an additional contact would provide total constraint. As a result, all of the possible form closure clamp locations for each locator set-up identified and each corresponding clamp location defines a unique fixture design. After filtering this set of possible fixture designs by checking for geometric violations such as the translating clamp 110 intersecting the workpiece or other fixels, the remaining fixture designs are ranked based on a scalar metric such as the ability to resist an applied force without exerting large contact reaction forces. This process only generates design fixtures for each fixel contacting the interior of at most one edge of the workpiece. Thereby, design fixtures where a fixel contacts a part vertex or multiple part edges are neglected. All design fixtures that can be mapped onto each other through translation or rotation are treated as equivalent and only one design fixture is generated from each equivalence class.

With reference to FIG. 3, the fixture set is initialized at Step S1. Input to the fixture processor 10 are a polygonal part boundary provided as a list of vertices, a set of geometric access constraints provided as a list of polygons defined in the part coordinate frame, height and width of the fixture plate 100, the spacing between the array of holes 120, the radii of the locators 130, 131 and 132, a description of the translating clamp 110 including a polygonal shape for the workpiece, locations of the unit spaced connectors 116 and 118, a polygon describing the shape of the clamp plunger 112 and the minimum and maximum travel limits of the clamp plunger 112 with the clamp tip 114 assumed to be a circle having the same radius as the locators 130, 131 and 132 and a quality metric that is a function accepting a fixture design for returning a scalar quality measure. The geometric access constraints and expected applied forces may be generated either manually or by the CAD-CAM processor 40.

Next, at Step S10, edges are grown by the fixel radius and edges are trimmed to remove self intersections at Step S20. The radius of the fixels, however, are not limited to one radius common to all fixels. Instead, each fixel may have a different radius. By expanding the polygonal part boundary by the radius of the locators, the locators may be treated as ideal points. Fixturing the expanded boundary with ideal points is then equivalent to fixturing the original part boundary with finite radius locators. Points on the edges of the expanded boundary may be considered as candidate positions for locators. Although the expanded boundary has rounded edges corresponding to contacts between a locator and an object vertex, only the linear edges of the expanded boundary are considered. Similarly, the constraint regions are grown by their fixel radius and then the sub-set of the expanded part edges which do not intersect the grown constraints are considered so that the fixels of all generated fixtures will avoid the access constraint regions.

Figure 5A:
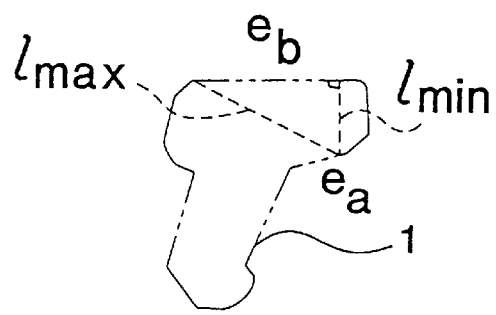
FIGS. 5(a), 5(b) and 5(c) illustrate the process for determining candidate locations for a second fixel location for a workpiece.
Figure 5B:
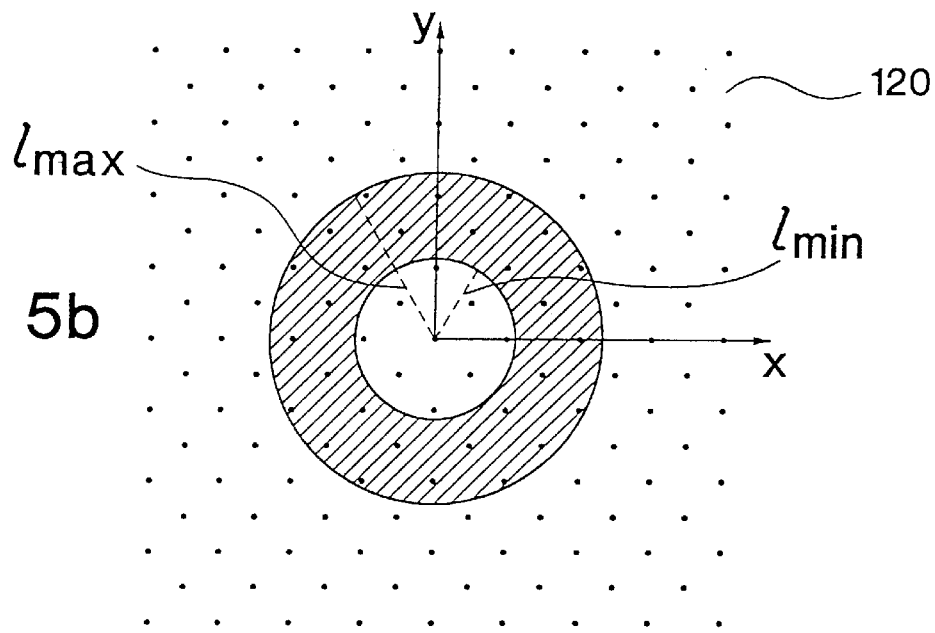
Figure 5C:
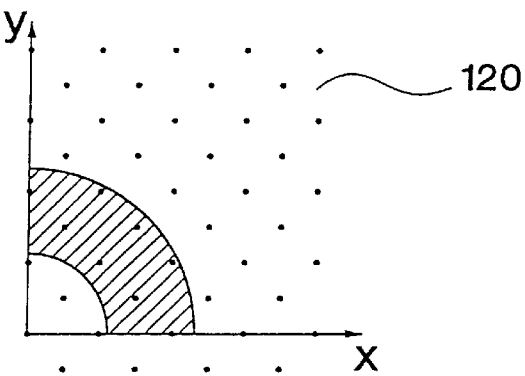

After the transformation so that the locators can be treated as points, all possible fixtures are enumerated. At Step S30, a set of all edge triplets are enumerated. Each combination of a locator triplet and an (x, y, θ) configuration specifies a locator set-up. To enumerate all locator triplets, the following steps are repeated for all combinations of three edges where either all of the three edges differ or two of the three edges are identical. For example, assume that ($e_1$, $e_5$, $e_2$) and ($e_4$, $e_7$, $e_4$) are both valid edge combinations. Because the order is not significant, there are $(_3^n)$+n·(n−1) such combinations for n edge segments. It is noted that because a workpiece with three locators on one edge cannot be held in form closure, combinations with three identical edges do not need to be considered. In a combination of three edges ($e_a$, $e_b$, $e_c$) it can be assumed without any loss in generality that ea makes contact with a locator at the origin of the array of holes 120. With reference to 5(a) through 5(c), by translating $e_a$ about the origin, $e_b$ sweeps out an annulus centered on the origin with an inner diameter equal to the minimum distance $1_{min}$ between $e_a$ and $e_b$ and an outer diameter equal to the maximum distance $1_{max}$ between $e_a$ and $e_b$. In other words, for any orientation of $e_a$, a translation is made along the extent of $e_a$ with $e_b$ sweeping out a parallelogram. The union of these parallelograms as $e_a$ is rotated forms an annulus. To eliminate equivalent fixtures, only the first quadrant of the annulus formed in FIG. 5(b) is considered as illustrated in FIG. 5(c). In Step S40, the first fixel is placed at the origin for one of the edge triplets. Thereby, the second fixel locations are enumerated corresponding to the first fixel location at Step S50.

After identifying each of the second fixel locations, all possible locations for the third fixel are identified at Step S60. If the first locator contacts $e_a$ and the second locator contacts $e_b$, then a third locator in contact with $e_c$ must be pairwise consistent with both $e_a$ and $e_b$. The exact regions swept out by $e_c$ while maintaining contact with the first two fixels $e_a$ and $e_b$ is difficult to characterize. However, an envelope that contains this region is easily found by independently considering each pair of $e_a$ a and $e_b$. The possible locations for $e_c$ with respect to $e_a$ form an annulus around the origin and the possible locations for $e_c$ with respect to $e_b$ form an annulus around the second locator. An intersection of these annuli provides a conservative bound on the set of array locations that simultaneously satisfy both constraints as illustrated in FIGS. 6(a) through 6(e).

This bound may be further refined by considering the angular limits for each annulus. By first identifying the angular limits of the part configurations that simultaneously contact the first and second locators, an [$\theta_{min}$, $\theta_{min}$] interval of reachable part angles is produced. Then, this interval is transformed by adding an [$\beta_{min}$, $\beta_{max}$] interval that delineates the minimum and maximum angles obtainable by a ray connecting $e_a$ and $e_c$. The resulting [($\theta_{min}+\beta_{min}$), ($\theta_{max}+\beta_{max}$)] interval describes a set of all possible angles between points on the $e_a$ and $e_c$ edge while $e_a$ and $e_b$ maintain contact with the first and second locators. This interval defines a sector of the $e_a e_c$ annulus with points outside of this section being unreachable by $e_c$. A similar construction provides a sector of the $e_b e_c$ annulus based on the β-interval corresponding to edges $e_b$ and $e_c$. The intersection of these annular sections provides a set of candidate locations for the third locator as illustrated in FIG. 6(e).

For each triplet of locators and associated contact edges, a set of consistent workpiece locations using contact equations are identified at Step S70. This is accomplished by a configuration space analysis that constructs the intersection points of edge/vertex-edge/vertex (ev-ev) contact equations. This calculation identifies intersection points between the ev-ev edges on the configuration-space obstacle corresponding to two-point contact situations. For example, if $e_a$, $e_b$ and $e_c$ are the edges of the workpiece in contact with fixels $v_1$, $v_2$ and $v_3$ respectively, then the combinations $e_a v_1$-$e_b v_2$, $e_a v_1$-$e_c v_3$, and $e_b v_2$-$e_c v_3$ all correspond to two contact situations that have an associated one dimensional locus of points in the (x, y, θ) configuration space. A three point contact is only possible at the intersections of these loci so that the set of part configurations where all three fixels are in contact may be found by solving further roots of the parametric equations describing these intersections.

The set of configurations that contain a single ev contact has two degrees of freedom which correspond to rotating the polygon or sliding the polygon laterally while maintaining the contact. By neglecting the edge and points and assuming a point fixel, the set of configurations corresponds to an unbounded surface that forms a helicoid in the (x, y, θ) configuration space. Because the polygon edge is not infinitely long, there are local applicability constraints that delimit the reachable sub-set of the infinite surface. The intersection of two such surfaces forms a one dimensional locus of points which may occur in two forms depending upon the geometry of the corresponding polygon edges. If the polygon edges are parallel, then the surfaces will intersect in zero, one or two infinite lines which are parallel to the xy plane. If the polygon edges are not parallel, then the surfaces will intersect along a curve that is unbounded in the sense that it is continuous over the interval θ∈[0,2 π] and connected at θ=0=2 π. These are referred to as parallel and non-parallel cases respectively and the one dimensional locus is referred to as an ev-ev edge. In the generic case, the intersection of three ev c-surfaces will define a finite collection of points. These points will also correspond to the intersection of the ev-ev edges corresponding to each pair chosen from the three surfaces. As a result, these intersection points can be found by first performing two of the three ev-ev edges defined by the three c-surfaces and then the points where the ev-ev edges intersect are found.

Figure 14:
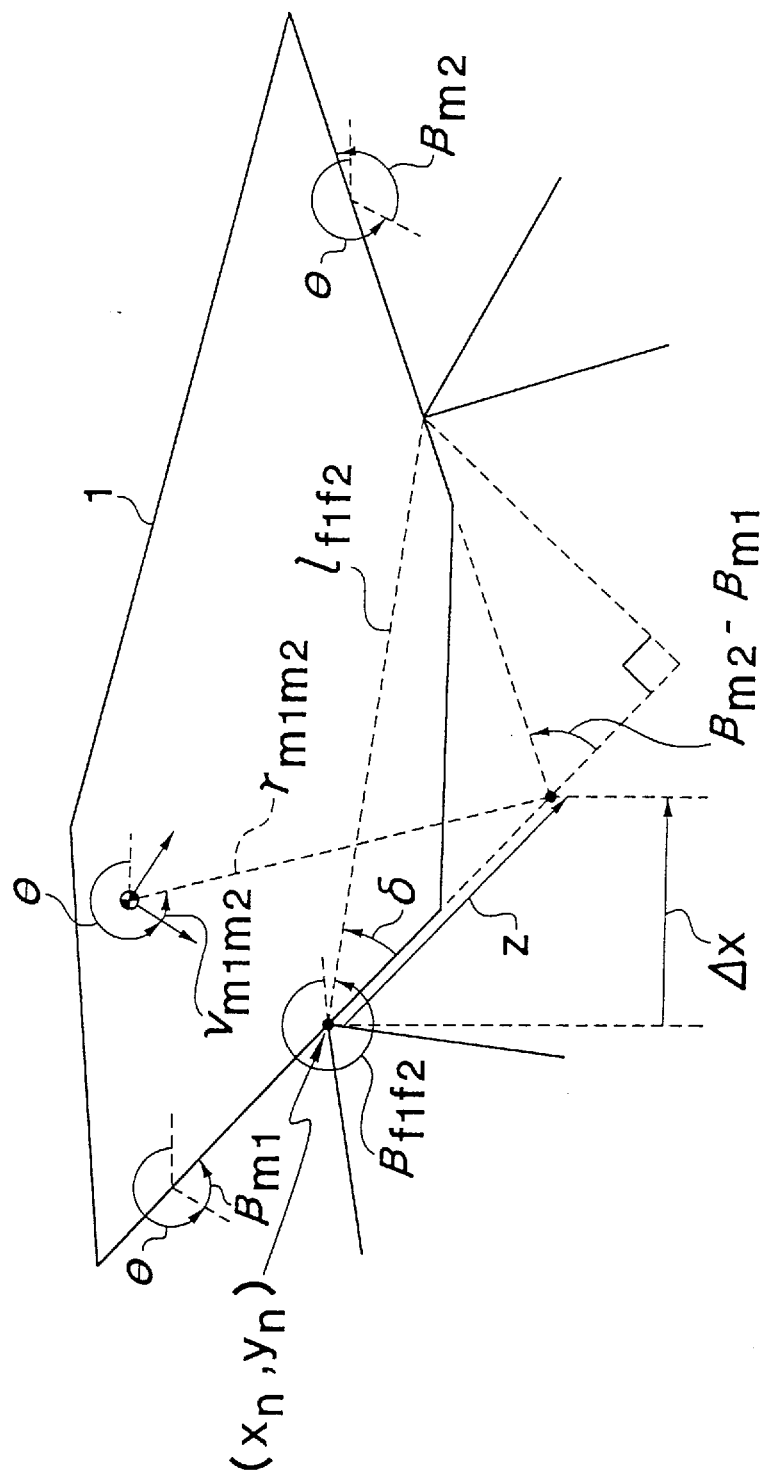
FIG. 14 illustrates the parameters used in deriving scalar functions $f_x(\theta)$ and $f_y(\theta)$.

The method of representing ev-ev edges and of computing the intersection points of two ev-ev edges will be discussed as follows: ev-ev edges may correspond to parallel or non-parallel cases. In the parallel case, the ev-ev edge corresponds to zero, one or two lines that are parallel to the xy-plane. These may be represented by xy line equations with an associated θ value that describes the elevation of the line about the xy-plane. In the non-parallel case, the ev-ev edge corresponds to a curve that is a function of θ with this curve being represented by two scalar functions: $f_x(\theta)$ and $f_y(\theta)$ which correspond to the x and y components of the curve respectively. The following equations with respect to FIG. 14 show the derivation of these functions:

$$x = x_{f1} + \Delta x - r_{m1m2}c_{(\theta+v_{m1m2})}$$

$$x = x_{f1} + c_{(\theta+\beta_{m1})}z - r_{m1m2}c_{(\theta+v_{m1m2})}$$

$$x = x_{f1} + c_{(\theta+\beta_{m1})}\left[l_{f1f2}c_\delta - \frac{l_{f1f2}s_\delta}{\tan(\beta_{m2}-\beta_{m1})}\right] - r_{m1m2}c_{(\theta+v_{m1m2})}$$

$$x = x_{f1} + c_{(\theta+\beta_{m1})}\left[l_{f1f2}c_{(\beta_{f1f2}-\theta-\beta_{m1})} - \frac{l_{f1f2}s_{(\beta_{f1f2}-\theta-\beta_{m1})}}{\tan(\beta_{m2}-\beta_{m1})}\right] - r_{m1m2}c_{(\theta+v_{m1m2})}$$

$$f_x(\theta) \leftarrow k_{0_x} + k_{1_x}s_\theta + k_{2_x}c_\theta + k_{3_x}c_\theta s_\theta + k_{4_x}s_\theta^2 \quad (1)$$

-continued where $$k_{0_x} = x_{f1} + l_{f1f2}c_{\beta_{m1}}\left[c_{(\beta_{m1}-\beta_{f1f2})} + \frac{s_{(\beta_{m1}-\beta_{f1f2})}}{\tan(\beta_{m2}-\beta_{m1})}\right]$$

$$k_{1_x} = y_{m1m2}$$

$$k_{2_x} = -x_{m1m2}$$

$$k_{3_x} = l_{f1f2}\left[-s_{(2\beta_{m1}-\beta_{f1f2})} + \frac{c_{(2\beta_{m1}-\beta_{f1f2})}}{\tan(\beta_{m2}-\beta_{m1})}\right]$$

$$k_{4_x} = -l_{f1f2}\left[-c_{(2\beta_{m1}-\beta_{f1f2})} + \frac{s_{(2\beta_{m1}-\beta_{f1f2})}}{\tan(\beta_{m2}-\beta_{m1})}\right]$$

$$f_y(\theta) \leftarrow k_{0_y} + k_{1_y}s_\theta + k_{2_y}c_\theta + k_{3_y}c_\theta s_\theta + k_{4_y}s_\theta^2 \qquad (2)$$

where $$k_{0_y} = y_{f1} + l_{f1f2}s_{\beta_{m1}}\left[c_{(\beta_{m1}-\beta_{f1f2})} + \frac{s_{(\beta_{m1}-\beta_{f1f2})}}{\tan(\beta_{m2}-\beta_{m1})}\right]$$

$$k_{1_y} = -x_{m1m2}$$

$$k_{2_y} = -y_{m1m2}$$

$$k_{3_y} = l_{f1f2}\left[c_{(2\beta_{m1}-\beta_{f1f2})} + \frac{s_{(2\beta_{m1}-\beta_{f1f2})}}{\tan(\beta_{m2}-\beta_{m1})}\right]$$

$$k_{4_y} = -l_{f1f2}\left[-s_{(2\beta_{m1}-\beta_{f1f2})} + \frac{c_{(2\beta_{m1}-\beta_{f1f2})}}{\tan(\beta_{m2}-\beta_{m1})}\right]$$

Given a pair of ev-ev edges, there are three possible cases. The first is the parallel/parallel case. In this case, both ev-ev edges corresponds to the parallel case so all three polygon edges must be parallel. There are either zero or an infinite number of solutions and in either case no intersection points are returned. The second case is the parallel/non-parallel case. The parallel case ev-ev edge is defined by a collection of lines that lie on constant θ planes. For each such line, x=$f_x(\theta_{line})$ and y=$f_y(\theta_{line})$ are computed and then a test is performed to determine whether the resulting (x,y) point lies on the line. The set of all resulting intersection points is returned because there are at most two lines and no more than two intersection points that may be returned. In the non-parallel/non-parallel case, ev-ev edges A and B are given and the points where A and B intersect will be defined by the θ values which simultaneously satisfy the equations:

$$f_{xA}(\theta)=f_{xB}(\theta)$$

$$f_{yA}(\theta)=f_{yB}(\theta)$$

The θ values are identified by finding the roots of the first equation rearranged to $f_{xA}(\theta)-f_{xB}(\theta)=0$ and then retaining all of the resulting θ values that also satisfy the second equation. It is possible to construct closed form equations to solve for the required roots, but a numerical procedure is used instead for reasons based on numerical robustness. Regardless of the solution method, there may be zero, one or two consistent θ values. These values are then supplied to the $f_{xA}(\theta)$ and $f_{yA}(\theta)$ functions to determine the corresponding x and y values. In certain non-generic situations, it is possible to have an infinite number of solutions which corresponds to the case where the two ev-ev edges are coincident. Each of the above cases has an associated method for recovering a set of configuration space points consistent with all three ev contacts. In generic cases, the set includes up to two discrete points. In non-generic cases, there may be an infinite set of consistent configurations but these non-generic situations do not constrain the object to a unique location and they are discarded.

Figure 7A:
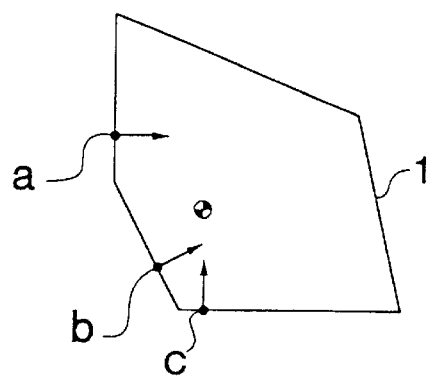
FIGS. 7(a) and 7(b) illustrate the mapping of a line of force onto a force sphere for generating a set of form closure clamp positions.
Figure 7B:
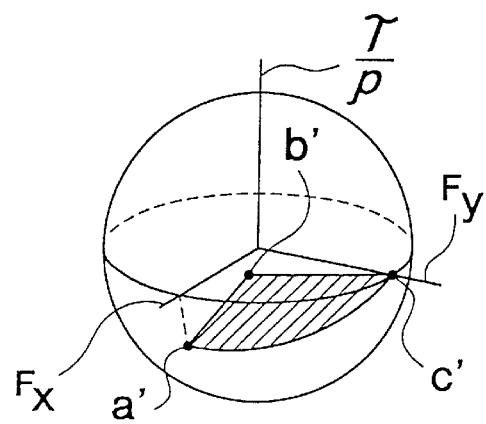

Next, all of the possible clamp positions that provide form closure are identified for the workpiece locations at Step S80. For each set-up, several candidate fixtures may be generated which each have a different clamp position. To generate the set of form closure clamp positions for a locator set-up, a constraint analysis is performed on the sphere and a unit sphere centered at the origin at the ($F_x$, $F_y$, $\tau/_{92}$) space of planar forces. This space represents both the direction and moment components of a line of force exerted in the plane as illustrated in FIG. 7(a) and 7(b) for example, where an example planar force F and its corresponding point on the force sphere is shown for the workpiece 1.

Figure 12:
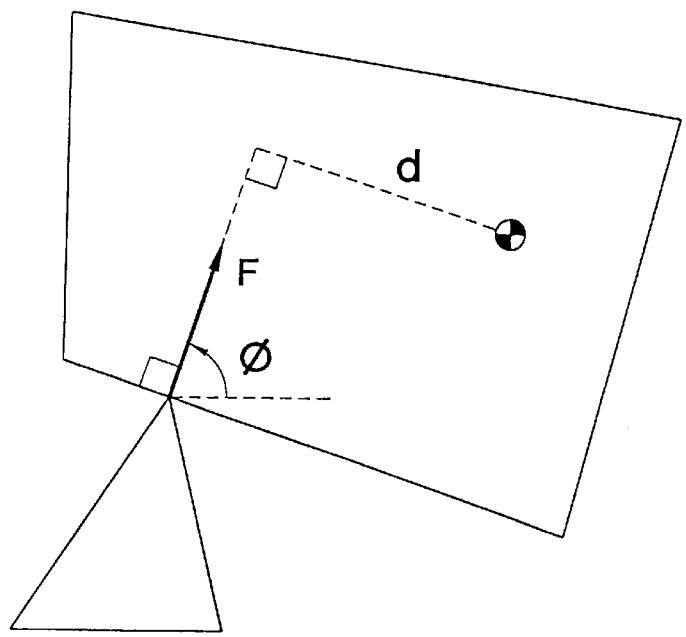
FIG. 12 illustrates parameters used in mapping a contact normal ray.

The equations describing this mapping will be described as follows with respect to the force sphere representation wherein only part of the capabilities are used. First, because contact friction is not considered, all contacts are analyzed as a single force corresponding to the contact normal. Second, because only conditions of pure kinematic closure are considered, a dynamic analysis or evaluation and the motions consistent with all possible contact modes are not performed. Thereby, the force sphere representation is quite simple where form closure is possible when the convex combination of the kinematic constraints expands the force sphere. By the dual nature of the force and motion wrenches, it is implied that motion cannot occur without violating at least one kinematic constraint. In order to construct the set of form closure fixtures that are possible for a given locator set-up, there are two key constructions used: the convex hull of the contact normals for the locator set-up and the "zig-zag" locus of all possible contact normals for the given workpiece. For each construction, a set of force space points is constructed that results from mapping particular contact normals onto the force sphere. The following equations are used with reference to FIG. 12:

$$F = \begin{bmatrix} \cos(\phi) \\ \sin(\phi) \\ -\frac{d}{\rho} \end{bmatrix} \qquad (3)$$

$$\hat{F} = \frac{F}{|F|} \qquad (4)$$

The first equation expresses the contact normal in the force space and the second equation projects the force onto the unit sphere by scaling the force to a unit magnitude. Because a dynamic motion analysis is not being performed, ρ may be any positive value.

Figure 13:
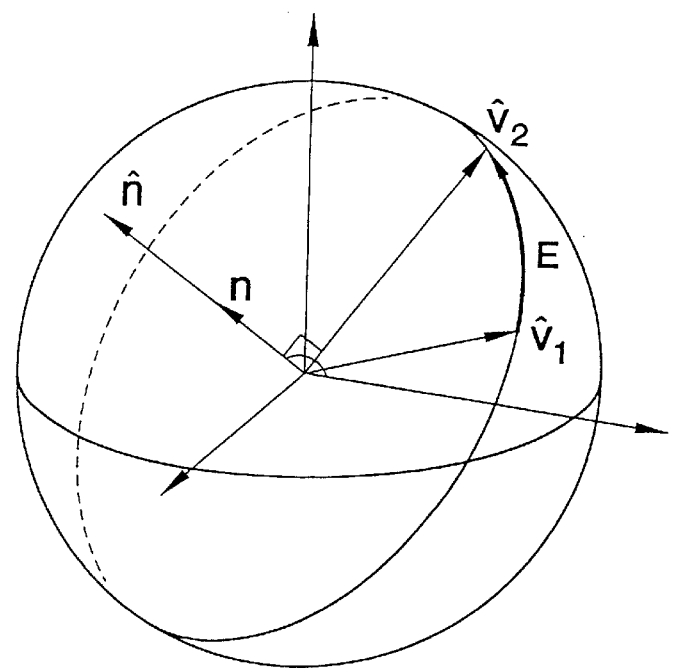
FIG. 13 illustrates the construction of edges which connects pairs of force-sphere points.

This construction provides a method for mapping arbitrary contact normals onto the force sphere. To construct the convex hull of three contact normals or the zig-zag locus of all possible contact normals, edges connecting pairs of force sphere points are constructed. These edges are constructed using the cross product construction as illustrated in FIG. 13. In this construction a great circle arc connecting the vertices $v_1$ and $v_2$ is implicitly represented by the normalized cross product vector n=normalized ($v_1 \times v_2$). The orientation of n may also be interpreted as a half-space constraint defining a hemispherical subset of the force sphere. To construct the convex hull of the contact normal for a locator set-up, each contact normal is first mapped onto the force sphere and then great circle edges are performed which connect all pairs of the three resulting points. Then, these edges are oriented so that the intersection of their corresponding half space constraints defines the interior of the convex hull. To construct the zig-zag locus of possible contact normals, each polygon edge e in turn is considered and the contact normal corresponding to each end point of e is then mapped onto the force sphere. The resulting pairs of force sphere points are connected for producing the vertical edges of the zig-zag locus. The diagonal edges may be constructed by connecting the points corresponding to contact normals on either side of each vertex. However, these diagonal edges are not analyzed because clamps are not permitted on a vertex in this process.

Figure 8A:
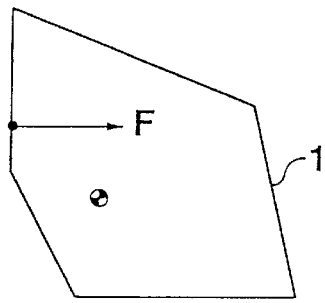
FIGS. 8(a) and 8(b) illustrate a set of points on a force sphere corresponding to three contact normals and a typical locator set-up.
Figure 8B:
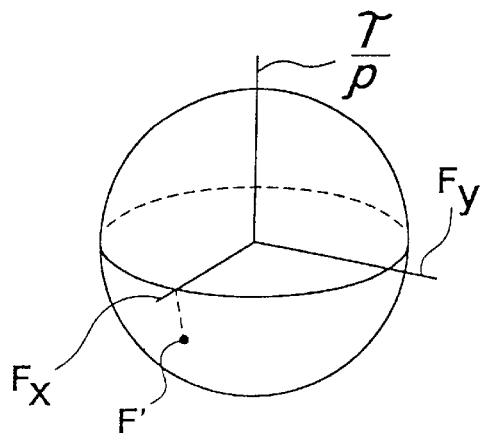

Each fixel/edge contact is treated as an ideal unilateral point constraint. Thereby each fixel may resist motion by exerting a reaction force in the direction of the inward pointing contact normal. The set of points on the force sphere corresponding to the three contact normals of a typical locator set-up is illustrated in FIGS. 8(a) and 8(b). The triangle on the force sphere in FIG. 8(b) delineates the set of all total contact reaction forces that may be produced by combining forces from all three contacts. A fixture design provides form closure exactly when the corresponding set of contact normals spans the entire force sphere. When this condition is satisfied, combinations of contact reaction forces may produce an arbitrary total reaction force which opposes an arbitrary motion. In other words, if the set of contact normals for a given fixture design spans the force sphere, then all possible motions will violate at least one kinematic constraint.

Figure 9A:
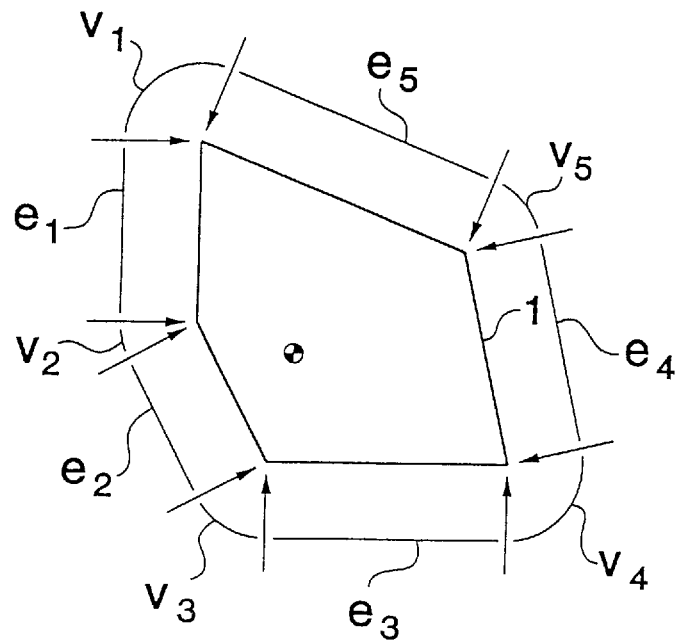
FIGS. 9(a) and 9(b) illustrate a "zig zag" locus of all forces that may be exerted by contacting a workpiece at a single point with the contact normals of FIG. 8(a) being shown for reference.
Figure 9B:
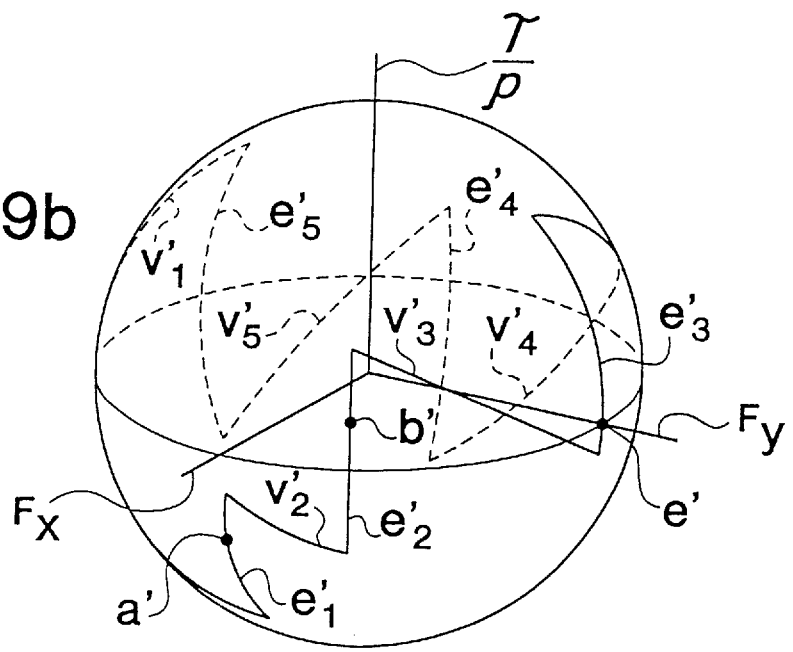
Figure 10A:
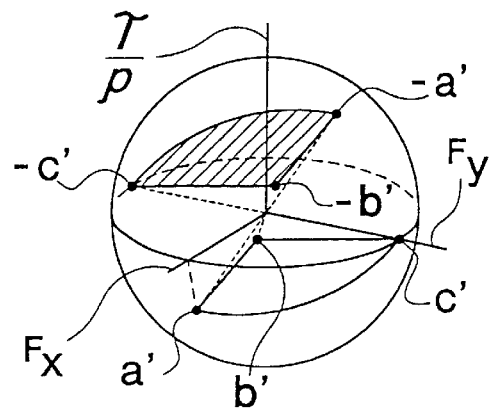
FIGS. 10(a), 10(b) and 10(c) and 10(d) illustrate generating a set of form closure clamp placements.
Figure 10B:
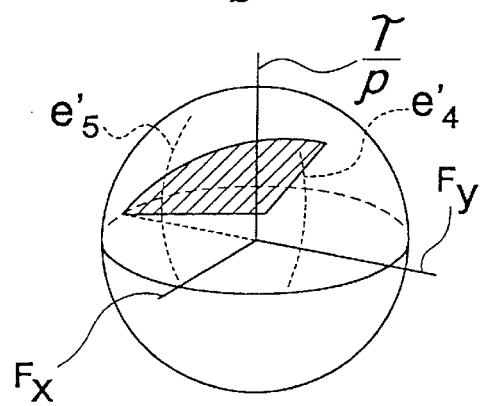
Figure 10C:
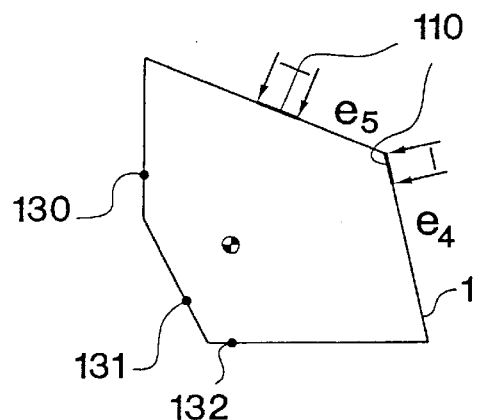
Figure 10D:
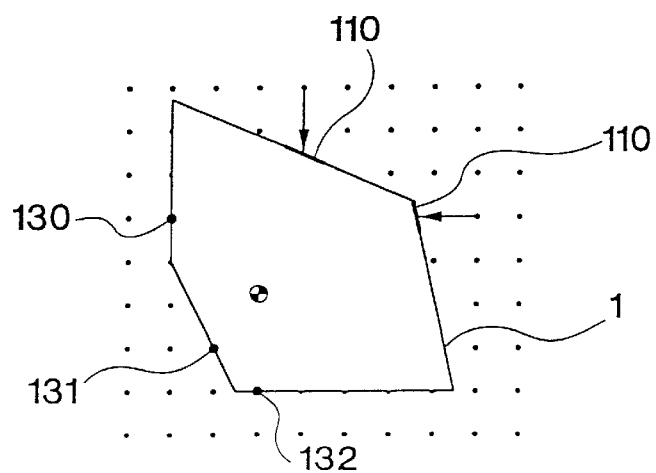

Given a set of three contact normals corresponding to a locator set-up, the set of forces that would produce form closure can be directly constructed if a fourth contact normal is provided. This is accomplished by forming the convex combination of three contact normals in the force sphere and then centrally projecting this triangle onto the opposite side of this sphere. The resulting negated triangle delineates a set of all forces that will produce form closure. If a clamp position can be found with a contact normal that corresponds to a point in the negated triangle, then this clamp position and all of the three locators will define a form closure fixture. The set of clamp positions that satisfy this condition can be directly constructed by characterizing the set of all contact reaction forces that can be applied by a contact applied by the perimeter of the grown part. FIGS. 9(a) and 9(b) illustrate this set of forces. It is noted that the set of all possible contact forces corresponds to a "zig-zag" locus of points that encircles the force sphere as illustrated in FIG. 9(b). Fixel contacts along the edges of the polygon correspond to the vertical edges of the locus. As a force moves along an edge, it is noted that only the torque component of its wrench will vary. Fixel contacts with the vertices of the polygon correspond to the diagonal locus edges. By intersecting the vertical locus edges with a set of possible form closure forces previously constructed, this set of all available edge contact normals can be identified that produce form closure for a given locator set-up. The set of contact normals are then mapped back onto the grown part perimeter to identify the regions where a fourth contact point will produce form closure at Step S90. Finally, the set of all possible clamp positions are identified by intersecting the identified regions with the horizontal and vertical edges of the array of holes as illustrated in FIGS. 10(a) through 10(d).

Next, the candidates are filtered through several geometric tests at Step S100 by checking clamp travel limits and clamp/workpiece and clamp/fixel interference for each clamp location. Fixtures are discarded where the translating clamp 110 intersects the workpiece with the locators 130, 131 and 132 or where the access constraints are met. Hereafter, the remaining fixtures are attempted to be fit on the array of holes 120 with fixtures that cannot be placed either horizontally or vertically being discarded in a simple bounding box check at Step S120. Fixtures that pass these tests are added to the fixture set at Step S130.

As seen in FIG. 3, the flow diagram proceeds so that each clamp location is considered at Step S140 and S150, each workpiece is considered at Steps S160 and S170 each third fixel is analyzed at Steps S180 and S190, each second fixel is analyzed at Step S200 and S210 and each edge triplet is generated at Steps S220. When all of the edge triplets are considered, the complete set of admissible fixture designs have been generated and this portion of the process ends.

After generating the complete set of admissible fixture designs, the admissible fixture designs are ranked according to a user supply called a scalar metric at Step S230. An automatically developed default quality metric may be used that favors fixtures which can resist expected applied forces without generating excessive contact reaction forces. Large contact forces are generally undesirable because they may deform the part. The effect of fixture designed geometry will be discussed with respect to FIGS. 11(a) and 11(b). If downward forces are to be applied to the workpiece 1, the fixture design in FIG. 11(b) is better than the fixture design and FIG. 11(b) because the fixture design of FIG. 11(b) develops large "wedging" forces between the fixels. On the other hand, if clockwise torques will be applied to the workpiece 1, then the fixture design of FIG. 11(b) is superior since the fixture design in FIG. 11(a) must develop large contact reaction forces to oppose rotation of the workpiece 1.

The default quality metric of this process allows the user to specify a variety of applied forces that are expected while the workpiece 1 is in the fixture. These forces are represented by a list of force sphere regions with associated magnitudes which allows the quality metric to simultaneously consider the effect of multiple operations such as machining, assembling, or pallet transferring operations. The quality metric scores each fixture by estimating the maximum contact reaction force required to resist any force of the expected applied forces. The ranking or the quality score is the negative of this force magnitude. The estimated maximum contact reaction force for a given fixture is calculated by considering each force sphere region in the applied force list, generating a discrete sampling of points in a region, computing the maximum contact reaction force required to resist each point, scaling the result by the associated magnitude and taking the maximum of all the resulting contact reaction forces. At Step S240, the optimal fixture determined by the ranking step is either manually or automatically located on the fixture plate.

Figure 4A:
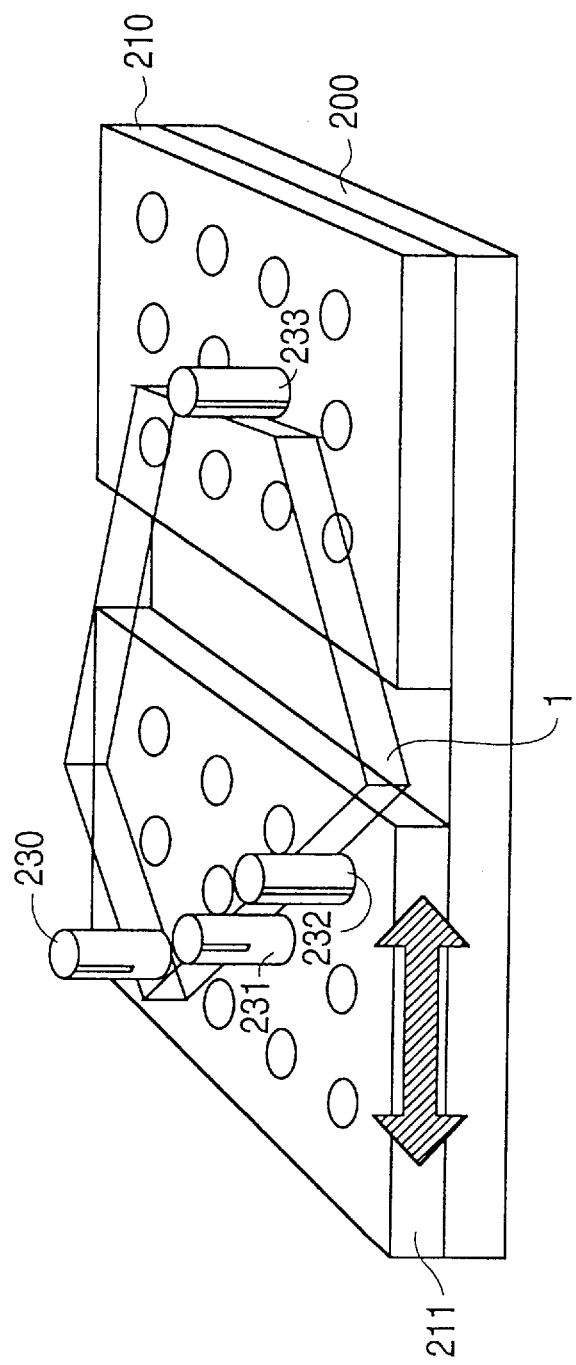

A second embodiment of the present invention will now be discussed with respect to FIG. 4(a). FIG. 4(a) illustrates a fixture vise 200, first and second fixture jaws 210 and 211 which each have an array of holes 221 and first, second, third and fourth locators 230, 231, 232, and 233. The left and right fixture jaws 210 and 211 (also known as fixture plates or fixture tables) may be translated along the surface of the fixture vise 200 as illustrated by the arrow. For immobilizing a workpiece 1, in contact with the locators 230, 231, 232, and 233 by the use of this fixture vise in the second embodiment of the present invention, the pose of the workpiece 1 needs only to be roughly identified so that the specified edges of the workpiece 1 contact the locators 230, 231, 232, and 233 for immobilizing the workpiece 1.

The fixture processor 10 with the second embodiment operates similar to the process discussed in FIG. 3. Three of the four locators 230, 231, and 232 are placed on one of the fixture jaws 210 and 211. FIG. 4(a) illustrates the three locators 230, 231, and 232 on the second fixture jaw 111. The fourth locator 233 is positioned on the first fixture jaw 210, and replaces the translating clamp in the method of operation discussed above. In the process for the second embodiment, a geometric representation of the workpiece 1 and the geometric constraints and expected applied forces for the workpiece 1 are input either manually or automatically. The fixture processor 10 then determines all of the possible configurations of the fixture device which hold/ secure/fixture the workpiece 1 during operation and also satisfy the geometric constraints. After generating the admissible fixture design for the fixture device, the workpiece 1 needs only to be generally placed in the fixture device. Then, by closing and tightening the fixture device, the workpiece 1 will rotate into its stable position due to the quasistatic forces.

The set of admissible fixture designs is produced in an amount of time dependent upon the complexity of the workpiece. However, based on the ranking, many design fixtures may be produced with very similar quality scores. Thus, a sub-set of the complete set of admissible fixture designs may still lead to a very high quality fixture design. The number of admissible fixture designs produced are primarily dependent upon the size of the workpiece with respect to the array of holes on the fixture jaws. When the array of holes is coarse, fewer designs are produced which reduces the execution time period. As a result, a grid step parameter may be used in the quality metric which allows the amount of time to be reduced if a more coarse array of holes is input. Accordingly, a method of interactively producing fixture designs may be used by first inputting a coarse array of holes and then refining the resolution so that a quick fixture design is obtained in a short amount of time and then a subsequent refined fixture design may be obtained by a more refined resolution.

The fixture design processes have been discussed with respect to fixture designs for modular components but this process may also be used to design dedicated fixtures. Modular fixturing components are somewhat more expensive than dedicated tooling which makes dedicated tooling preferable in mass production environments where multiple copies of the fixture are used for a large number of cycles. In mass production situations, the fixture process could be used to produce fixture designs which are then fabricated with a plane tooling plate. Because the major costs of modular fixturing components is in the precisely machined fixture table or fixture vise, cost effective fixture designs can be achieved in this manner. This approach also has the additional advantage that product type fixtures can be built from modular components for initial testing purposes.

The application of the first method of operation to the fixture vise of FIG. 4(*a*) causes three locators to be positioned on one of the first and second fixture jaws 210 and 211, and causes a fourth locator to be positioned on the other of the first and second fixture jaws 210 and 211. The type of fixtures created by the first method of operation are called TYPE II fixtures. Fixture designs developed according to this first method of operation, which assumed the use of a translating clamp and positioned the clamp to translate a fixel in the vertical direction, will need to be rotated 90 degrees for application to the fixture vise of FIG. 4(*a*).

SECOND METHOD OF OPERATION

A second process performed by the fixture processor 10 will now be described. This second method of operation produces both Type II fixtures and Type I fixtures. Type I fixtures are fixtures having two locators 230, 231 positioned on the first fixture jaw 210 and two locators positioned on the second fixture jaw 211 such as shown in FIG. 4(*b*).

Figure 15:
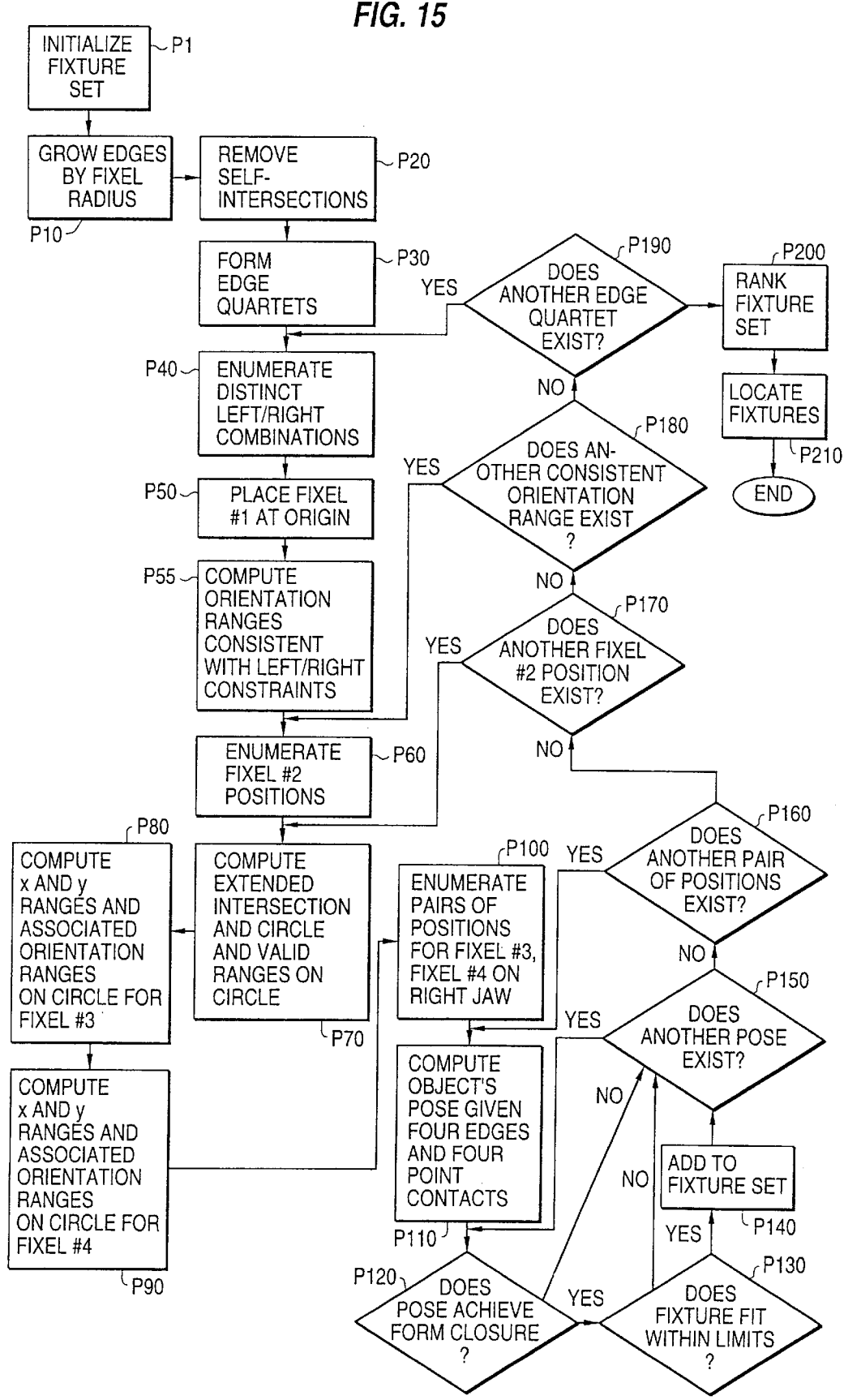
FIG. 15 illustrates a flow chart for another method of operation according to the present invention.

A general description for the second process performed by the fixture processor 10 will be provided before specifically discussing the process illustrated in the flow chart of FIG. 15.

In the description which follows, configuration specifies the object's pose, $\vec{F}$ the position of the pegs, $\sigma$ the jaw separation distance, $E_i$ refers to an edge segment, $\vec{E}$ refers to a quartet of edges $\vec{E}_i = (E_{i1}, E_{i2}, E_{i3}, E_{i4})$, $R(E_i)$ refers to the fact that $E_i$ contacts a locator on the right jaw 211, $L(E_i)$ refers to the fact that $E_i$ contacts a locator on the left jaw 210, $E_{i,k}$ refers to the $k^{th}$ edge segment of the quartet $\vec{E}_i$, $\vec{F}_{i,j}$ refers to the $j^{th}$ quartet of locator positions contacting edge segments $\vec{E}_i$, and $F_{i,j,k}$ refers to the position of the $k^{th}$ locator in the set of locator positions $\vec{F}_{i,j}$.

Furthermore, in the equations which appear below, the $\oplus$ operator describes range addition: $<a,b> \oplus <c,d> = <a+c, b+d>$; $\{<a_1,b_1>, <a_2,b_2>\} \oplus <c,d>$ is shorthand for the union of the resulting range sums $<a_1,b_1> \oplus <c,d>, <a_2,b_2> \oplus <c,d>$.

As with the first method, the second process begins by expanding the projected workpiece boundary by the radius of the locators 230, 231, 232 and 233. Again, the locators 230, 231, 232, and 233 do not need to have the same radius, but can each have a different radius. Locators 230, 231, 232 and 233 can be treated as points on the transformed edges. Similarly, the constraint regions are grown by their fixel radius and then the sub-set of the expanded part edges which do not intersect the grown constraints are considered so that the fixels of all generated fixtures will avoid the access constraint regions.

For a Type I fixture, the possible first locator positions on one of the first and second fixture jaw 210, 211 are enumerated for a quartet of edges. Assuming a first edge of the quartet of edges contacts the first locator, for one of the enumerated first locator positions, the positional and orientation constraints for the quartet of edges are determined. The possible second locator positions are then determined to lie within an annulus swept out by a second edge according to the positional and orientation constraints. Then for one set of first and second locator positions, each contacting an edge of the workpiece, the pose of the workpiece is parameterized. The processor 10 then enumerates the possible third and fourth locator positions on the other one of the first and second jaws 210 and 211 based on the parameterization. The possible poses of the workpiece which achieve simultaneous contact with the set of first, second, third and fourth locator positions are enumerated. The processor then determines whether a pose of the workpiece and the set of the first, second, third, and fourth locator positions achieves form closure. Instead of parameterizing the pose of the workpiece, the third and fourth locator positions can be determined using the annulus technique for determining second locator positions. With either method, however, the translation of the other one of the first and second jaw must be accounted for in determining possible third and fourth locator positions.

For Type II fixtures, after the parameterization, the processor 10 enumerates positions, based on the parameterization, of the third locator on the one of the first and second fixture jaws 210 and 211 where the first and second locators are positioned. The processor 10 then computes the poses of the workpiece which achieve simultaneous contact with the first, second and third locator. For each simultaneous contact pose, the positions of the fourth locator on the other one of the first and second fixture jaws 210 and 211 which contact on edge of the workpiece are enumerated. The processor 10 then determines whether a pose of the workpiece and the set of first, second, third and fourth locator positions achieves form closure.

The method for both Type I and II fixtures then proceeds to determine whether other workpiece poses exist and whether other locator set-ups exist. As a result, all of the possible locator set-ups and workpiece poses achieving form closure are determined and a fixture set is formed.

After filtering the set of possible fixture designs by checking for geometric violations, the remaining fixture designs are ranked based on a scalar metric such as the ability to resist an applied force without exerting large contact reaction forces. This process only generates design fixtures for each fixel contacting the interior of at most one edge of the workpiece. Thereby, design fixtures where a fixel contacts a part vertex or multiple part edges are neglected. All design fixtures that can be mapped onto each other through translation or rotation are treated as equivalent and only one design fixture is generated from each equivalence class.

Figure 29:
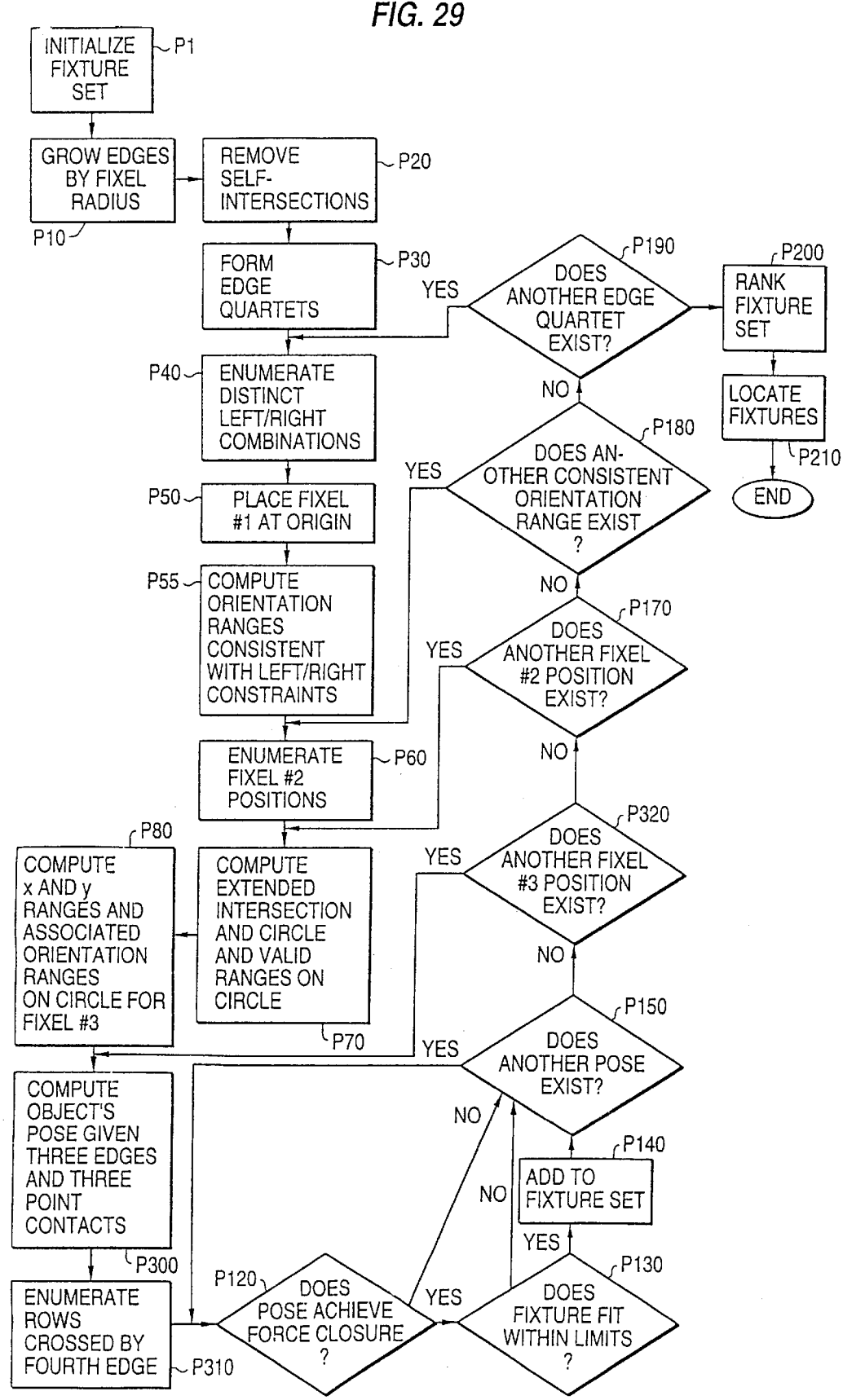
FIG. 29 illustrates a flow chart for another method of operation according to the present invention.

With reference to FIG. 15, the process for determining Type I fixtures will be described. FIG. 29 illustrates the process for determining Type II fixtures according to this method of operation. A comparison of FIGS. 15 and 29 shows that FIG. 29 includes many of the same steps as FIG. 15. Therefore, where appropriate, differences with respect to the determination of Type II fixtures are described. Otherwise, the determination of Type II fixtures will not be described since this determination is readily apparent to one skilled in the art based on the description of determining Type I fixtures with respect to FIG. 15.

The fixture set is initialized at Step P1. Input to the fixture processor 10 are a polygonal part boundary provided as a list of vertices, a set of geometric access constraints provided as a list of polygons defined in the part coordinate frame, height and width of the first and second fixture jaws 210 and 211, the spacing between the array of holes 221, the radii of the locators 230, 231, 232 and 233, the maximum and minimum spacing between first and second fixture jaws 210 and 211 and a quality metric (such as expected applied forces) that is a function accepting a fixture design for returning a scalar quality measure. In the event that certain of these inputs are not entered, such as minimum spacing, defaults will be assumed. The geometric access constraints and expected applied forces may be generated either manually or by the CAD-CAM processor 40.

Next, at Step P10, edges are grown by the fixel radius or radii and edges are trimmed to remove self intersections at Step P20. By expanding the polygonal part boundary by the radius or radii of the locators, the locators may be treated as ideal points. Fixturing the expanded boundary with ideal points is then equivalent to fixturing the original part boundary with finite radius locators. Points on the edges of the expanded boundary may be considered as candidate positions for locators. Although the expanded boundary has rounded edges corresponding to contacts between a locator and an object vertex, only the linear edges of the expanded boundary are considered. Similarly, the constraint regions are grown by their fixel radius or radii and then the sub-set of the expanded part edges which do not intersect the grown constraints are considered so that the fixels of all generated fixtures will avoid the access constraint regions.

After this transformation the locators can be treated as points, all possible fixtures are enumerated. At Step P30, a set of all edge quartets are formed. It is noted that two of the edges in a quartet may be the same (e.g. $\vec{E}_1 = (E_1, E_1, E_2, E_3)$).

As discussed above, each locator set-up and workpiece pose achieving form closure forms a potential admissible fixture. To enumerate all potential fixtures, the following steps are repeated.

At Step P40, for a quartet of edges, all combinations of intended jaw contacts are enumerated. Without loss of generality, only seven different situations need to be considered: four where three edge segments contact the one fixture jaw, and three where pairs of edge segments contact both fixture jaws. The mirror image of these situations can then be used wherein the locators on, for instance, the left fixture jaw are now positioned on the right fixture jaw and vice versa.

Without any loss of generality it can be assumed in Step P50 that the first locator $F_{i,j,1}$ is at the origin of one of the first and second jaws because fixture configurations are relative.

Next in Step P55, the orientation ranges consistent with left/right constraints are computed. The workpiece's orientation $\theta$ must satisfy the constraint that, without loss of generality, an edge contacting a locator on the left jaw cannot lie entirely to the right of an edge contacting a locator on the right jaw, and vice versa. The term $\{<\theta_{consistent}>\}$ refers to the orientations resulting from considering this constraint over all pairs of opposite jaw edges. The orientations consistent with two edges can be found in constant time because we only need to check the orientations of the vectors between the vertices. Specifically, for each pair of edges, one edge contacting the first locator, the range of angles satisfying the left/right constraints are determined. The $\{<\theta_{consistent}>\}$ is then determined as the intersection of these ranges. For instance, suppose the coordinate frame of reference is positioned with its origin at the first locator. A first range of angles may exist from $-10$ degrees to 190 degrees, while a second range of angles may exist from 170 degrees to 10 degrees. Thus, two $<\theta_{consistent}>$ would exist, one from $-10$ degrees to 10 degrees and the other from 170 degrees to 190 degrees. One of the $<\theta_{consistent}>$ are then chosen for processing.

Next in Step P60, the second locator positions are enumerated. Enumerating the second locator positions involves determining the workpiece's orientations consistent with Left/Right constraints, and further determining length constraints on the position of the second locator.

Figure 16:
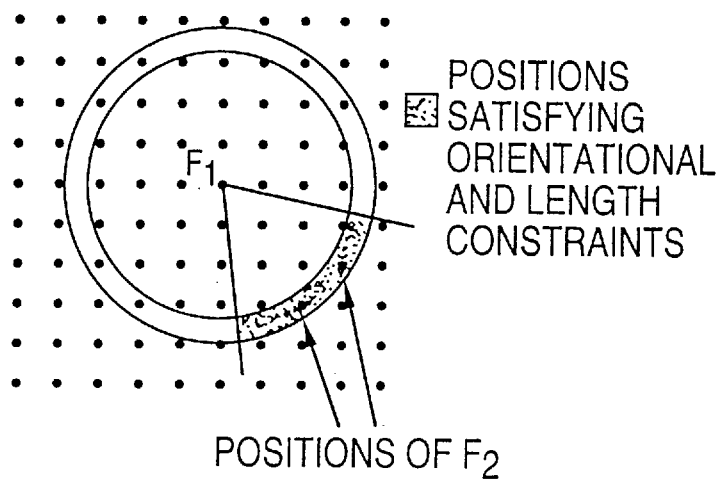
FIG. 16 illustrates the wedge annulus swept out by a second edge of the workpiece when translating a first edge about the origin.

By translating $E_{i,1}$ about the origin within the orientation constraints $<\theta_{consistent}>$, $E_{i,2}$ sweeps out a wedge annulus centered at the origin as shown in FIG. 16. The wedge of the annulus can be defined by $<W_{consistent}>$ $$<W_{consistent}> = <\theta_{consistent}> \oplus \tag{5}$$

$$<\min_{v_1 \in E_{i,1}, v_2 \in E_{i,2}} \angle(v_1 - v_2), \max_{v_1 \in E_{i,1}, v_2 \in E_{i,2}} \angle(v_1 - v_2)>$$

Figure 17:
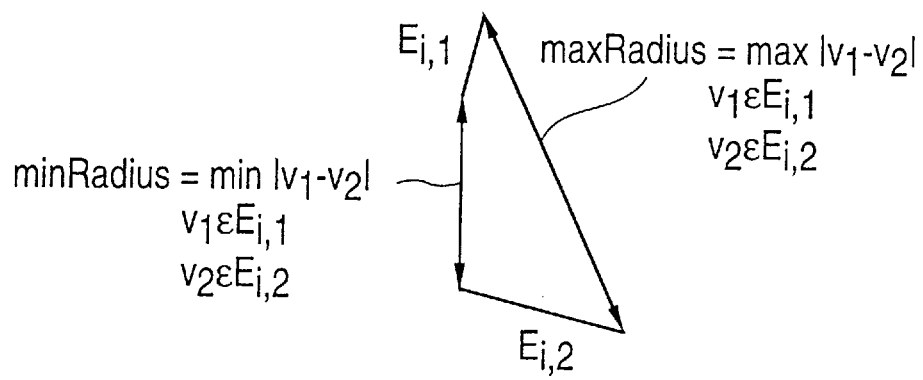
FIG. 17 illustrates the relationship between the vertices of the first and second edge and the minimum and maximum radius of the wedge annulus.

Where, as shown in FIG. 17, $$\text{maxRadius}_i = \max_{v_1 \in E_{i,1}, v_2 \in E_{i,2}} |v_1 - v_2|$$

$$\text{minRadius}_i = \min_{v_1 \in E_{i,1}, v_2 \in E_{i,2}} |v_1 - v_2|$$

Stated another way, since (1) at least one endpoint of all extremal length chords between any two edges coincides with a vertex of one of those edges and (2) the orientations of vectors between points on two edges form a continuous interval range, which boundaries result from pairwise combinations of vertices of those edge segments, the second locator is constrained in two ways: the distance between $F_{i,j,1}$ and $F_{i,j,2}$ must agree with the distance between two points on $E_{i,1}$ and $E_{i,2}$ and the origination between $F_{i,j,1}$ to $F_{1,j,2}$ is constrained to lie within the range $<W_{consistent}>$ (see equation (5))

To simplify the task of computing the region swept by the third and fourth edges, we would like to parameterize the pose in a single variable in Step P70. This parameterization technique provides a bound on the region swept out by a third or fourth edge. The annulus technique discussed above with respect to enumerating positions of the second locator may be used instead of the parameterization technique described below. The parameterization technique, however, is preferred since this technique provides a tighter bound than the annulus technique. Furthermore, the parameterization technique is a reasonable approach because the first two contacts provide two constraints, and the two dimensional representation of the workpiece only has three degrees of freedom.

Figure 18:
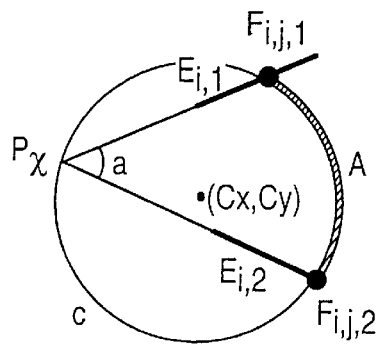
FIGS. 18, 19, 20(a) and 20(b) illustrate the parameterization of the pose of the workpiece.

As shown in FIG. 18, the workpiece's pose is parameterized by the position of the extended intersection of the first two edges. The valid extended intersections sweep out a circular arc. This parameterization implicitly satisfies the contact constraints because of the geometric property that the interior angle between a point on a circle's boundary and a circular arc remains constant.

Let $P_\chi$ be the extended intersection (refer to FIG. 18) of the two edge segments, C be the circle including the two contact points $F_{i,j,1}$ and $F_{i,j,2}$ and $P_{102}$, and let A be an arc defined by the two points. Contact is maintained because the interior angle of A with respect to $P_\chi$ is a if and only if $P_\chi$ is on C's boundary, producing the parameterization: $\chi = \angle (P_\chi\text{-center}(C))$. The parameterization breaks down when the two lines are parallel, but those cases are irrelevant, since if the part is fixtured using two sets of parallel sides, its position is not constrained, and if only one pair of edges are parallel, we can parameterize the contact using the non-parallel edges.

Given the first two edge segments $E_{i,1}, E_{i,2}$, and locator positions $F_{i,j,1}, F_{i,j,2}$, the extended intersection circle C is generated as follows. First, we compute the extended intersection $P_\chi$ of $E_{i,1}$ and $E_{i,2}$ and then rotate the edge segments and the intersection point by min($<\theta_{consistent}<$). Then we translate the edges $E_{i,1}$ and $E_{i,2}$ and the intersection $P_{102}$ so that the edge segments intersect the locator positions $F_{i,j,1}$, $F_{i,j,2}$. The circle C is constructed from the first and second locator positions $F_{i,j,1}$, $F_{i,j,2}$, and the translated, rotated, extended intersection $P_\chi$.

In order to compute the region swept over by an edge, we first want to determine the set of valid extended intersections. The constraints on the position of the extended intersection $P_\chi$ are separated into constraints concerning the valid orientations $<\theta_{consistent}>$, termed $<\chi_{\theta consistent}>$, and constraints due to edge geometries $\{<\chi_{lengths}>\}$. The parameterization of using the extended intersection for non-parallel edges breaks down when the extended edges contact the first and second locators but the actual edges do not; $\{<\chi_{lengths}>\}$ characterizes the ranges of extended intersections for which the actual edges contact the first and second locators. The term $\{<\chi_{consistent}>\}$ refers to the extended intersections satisfying both criteria($\{<\chi_{consistent}>\} = <\chi_{\theta consistent}> \cap \{<\chi_{lengths}>\}$). We are using a shorthand notation where $<\chi_{\theta consistent}> \cap \{<\chi_{lengths}>\}$ refers to intersecting all of the ranges in the set $\{<\chi_{lengths}>\}$ with $<\chi_{\theta consistent}>$, in other words, filter $\{<\chi_{lengths}>\}$ by $<\chi_{\theta consistent}>$. Therefore, $\{<\chi_{consistent}>\}$ defines a range within which a workpiece may be rotated and still maintain-contact with the first and second locators.

Figure 19:
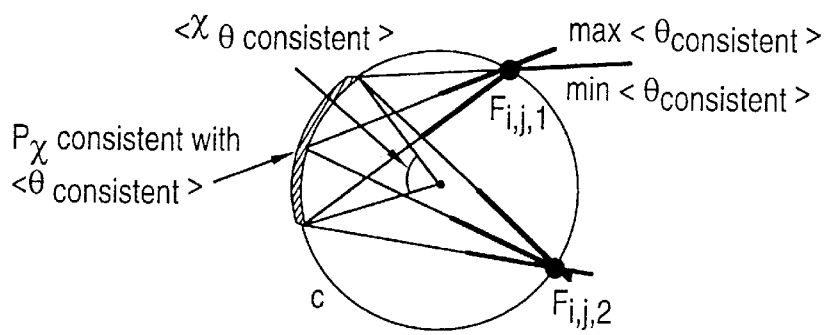

The set of extended intersections consistent with the valid orientations $<\chi_{\theta consistent}>$ is computed by simply predicting the position of the extended intersection at the extremal orientations of $<\theta_{consistent}>$ as shown in FIG. 19.

Figure 20A:
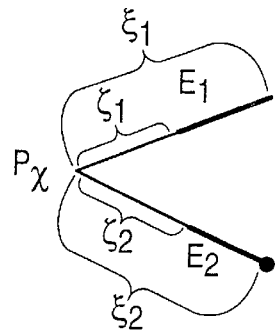
Figure 20B:
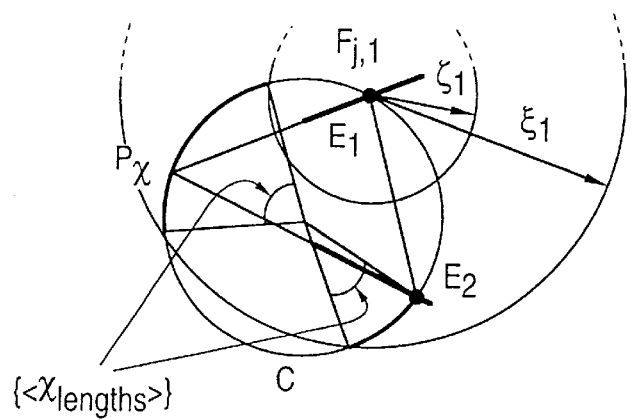

FIG. 20(b) illustrates the set of extended intersections consistent with the edge geometries $\{<\chi_{lengths}>\}$ which is computed by determining the minimum and maximum distances from the extended intersection to both edge segments $E_{i,1}, E_{i,2}$. As illustrated in FIG. 20(a), $\zeta_k$ refers to the minimum distance, and $\xi_k$ refers to the maximum distance. $\{<\chi_{lengths}>\}$ consists of all of the arcs within the annulus for $F_{i,j,1}, \zeta_1, \xi_1$ and $E_{i,1}$ and the annulus for $F_{i,j,2}, \zeta_2, \xi_2$ and $E_{i,2}$.

After parameterizing the pose of the workpiece in Step P70, the x and y ranges and associated orientation ranges for the third and fourth locator are determined in Steps P80 and P90. Since the same process is performed in both Steps P80 and P90, only the processing performed in Step P80 with respect to the third locator will be described.

Figure 21:
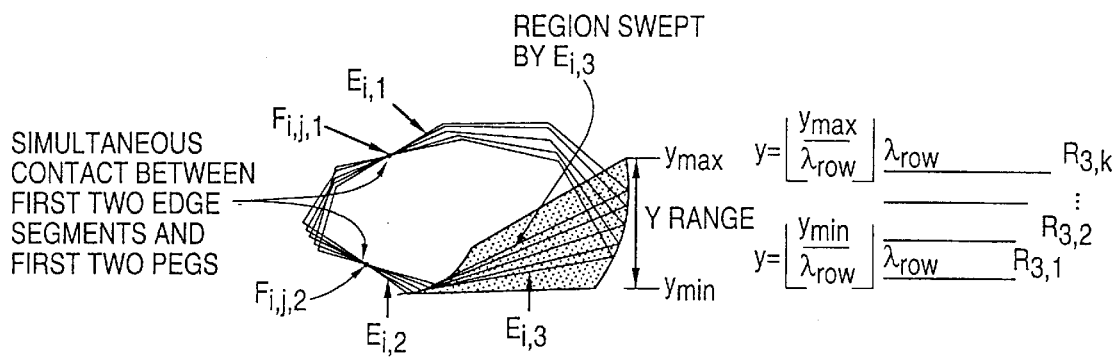
FIG. 21 illustrates the y range swept out by a third edge of the workpiece.

The grid rows crossed by the edge segment $E_{i,3}$, are computed by determining the continuous range of y coordinates covered by $E_{i,3}$, while maintaining contact between the first two edge segments and the first and second locators (see FIG. 21). Note that extremal y coordinates must be due to vertices $v_{i,3,1}, v_{i,3,2}$ of $E_{i,3}$. Therefore, we only need to compute the y ranges of the vertices $v_{i,3,1}, v_{i,3,2}$ to compute the y range of the region swept by edge $E_{i,3}$.

Over each continuous range $<\chi_{consistent}>$ from the set of ranges $\{<\theta_{consistent}>\}$, the y coordinate range for each vertex is found by testing the extremal orientations of $<\theta_{consistent}>$ wherein $\chi$ is a value within the range $<\theta_{consistent}>$, and also orientations of locally extremal y values. The following equation is used to find the y coordinate at the extremal orientations of $\chi$.

$$y(\chi) = C_y \left( y + R_{sin}\chi - S_{sin}\left(\eta - \frac{\chi}{z}\right) \right) \quad (6)$$

where $$\eta = \frac{\pi - \beta}{2} - \gamma;$$

Figure 22:
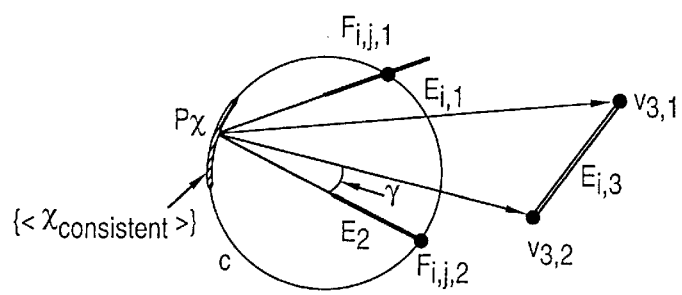
FIG. 22 illustrates the relationship between the parameterizing circle and the third edge of the workpiece.

$\gamma$ refers to the interior angle between $P_\chi E_{i,2}$ and $P_\chi v_{i,3,2}$; S refers to the distance between $P_\chi$ and v; $\beta$ refers to the orientation of $E_{i,2}$'s contact point ($F_{i,j,2}$) with respect to the center of the parameterizing circle C; R refers to the radius of the parameterizing circle C; and $C_y$ refers to the y coordinate of the center of the parameterizing circle C. FIG. 22 illustrates the relationship between the foregoing variables.

As discussed above, however, the y coordinate range may be a larger range than that defined by the values corresponding to the extremal values of $\chi$ due to local extremal y values. Local extremal y values (orientations) are found by substituting u=tan ($\chi/4$) in equation (6) and solving for u in $$\frac{dY(u)}{du} = 0.$$

$$Y(u) = \quad (7)$$

$$C_y + \frac{1}{(1+u^2)^2} (R4u(1-u^2) - S(1+u^2)((1-u^2)\sin(\eta) - 2u\cos(\eta)))$$

-continued $$\frac{dY(u)}{du} = \quad (8)$$

$$\frac{4}{(1+u^2)^3}\left(R+\cos(\eta)S+S\sin(\eta)u-6Ru^2+S\sin(\eta)u^3+Ru^4-\frac{1}{2}\cos(\eta)Su^4\right)$$

If local extremal y values exist, then these values may bound the y coordinate range. Essentially, the largest and smallest y coordinate values, determined from the extremal $\chi$ values and local extremal y values, define the y coordinate range. Given the range of y coordinates of the region swept over by an edge, we can easily enumerate the covered lattice rows. Given the set of discrete grid rows crossed by $E_{i,3}$, the next step is to determine the x coordinate ranges along each row swept by $E_{i,3}$. Solving these equations for $\chi/2$ has the difficulty that $\chi$ is periodic with periodicity $2\pi$. The difficulty lies in the fact that equivalent orientations $\chi=\pi$ and $\chi=-\pi$ correspond to distinct $\chi/2$ values ($\pi/2$ and $-\pi/2$). We handle this conundrum by simply checking both the computed root $\pi/2$, and also the symmetric value $$\frac{\chi}{2}+\pi.$$

Figure 23:
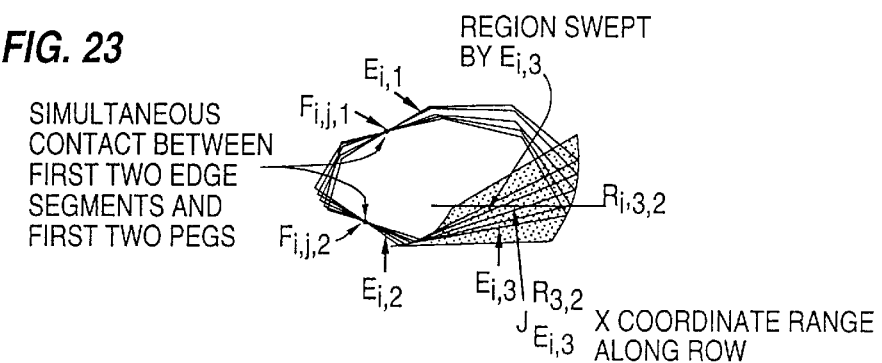
FIG. 23 illustrates the x range swept out by the third edge of the workpiece.

We now explain how we compute $J_{E_{i,k}}^{R^{i,k,1}}>$, the range of x coordinates (with respect to the left jaw origin) along a row $R_{i,3,1}$ swept over by edge $E_{i,3}$. The first step involves computing the set of valid extended intersections for which $E_{i,3}$ intersects the lattice row $$R_{i,3,b}\left\{<\begin{array}{c}R_{i,3,l}\\\chi_{consistent}\end{array}>\right\}\cdot\left\{<\begin{array}{c}R_{i,3,l}\\\chi_{consistent}\end{array}>\right\}$$

is constructed by incorporating the intersection constraint with the previously computed range of extended intersections $\{<\chi_{consistent}>\}$. The extended intersections corresponding to $E_{i,3}$ intersecting $R_{i,3,1}$ are found by enumerating the orientations at which the vertices $v_{i,3,1}$, $v_{i,3,2}$ of $E_{i,3}$ touch $R_{i,3,1}$, in other words solving equation (6) for $Y(\chi)=R_{(i,3,1)}$ (i.e., the y position of the row) and checking the extremal orientations of $\{<\chi_{consistent}>\}$. FIG. 23 illustrates the range of x coordinates $$<\begin{array}{c}R_{i,3,2}\\J_{E_{i,3}}\end{array}>,$$

with respect to the left jaw origin, along a row $R_{i,3,2}$ swept over by edge $E_{i,3}$.

Figure 24:
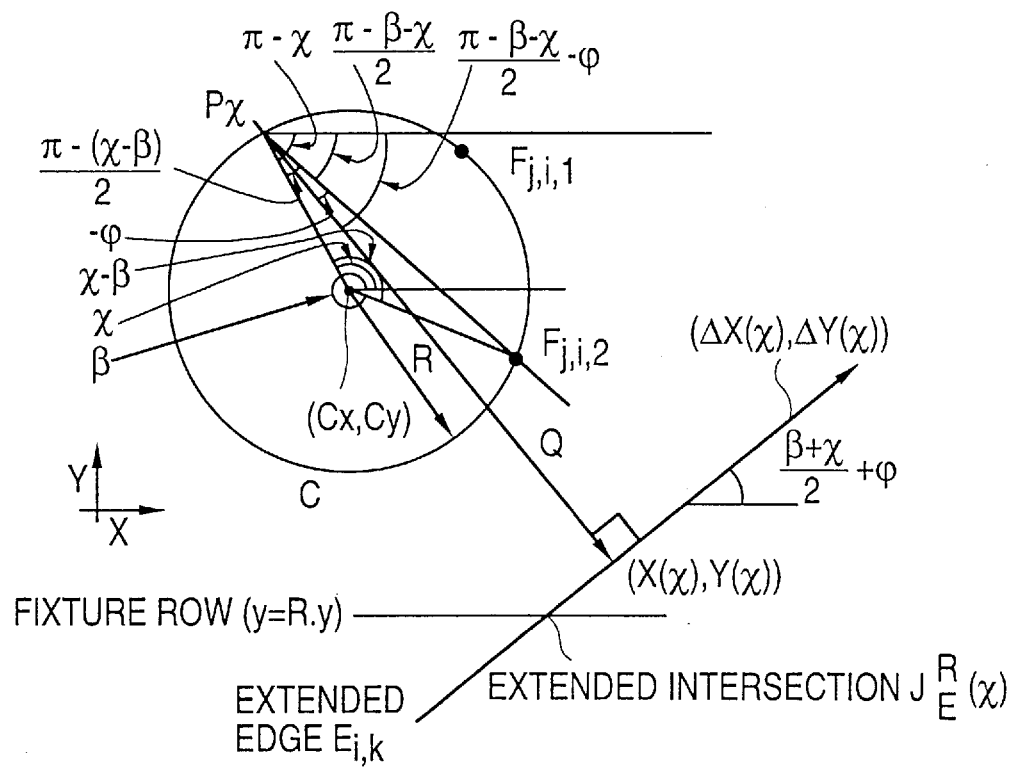
FIG. 24 shows the model used in computing the x coordinate of the extended intersection between an edge and a horizontal grid row.

FIG. 24 shows the model used in computing the x coordinate of the extended intersection, termed $J(\chi)$ (refer equation (9) below), between an edge segment and a horizontal grid row as a function of $\chi(u=\tan(\chi/4)$.

$$(X,Y)(\chi) = \left(C_x+R\cos\chi+Q\cos\left(\frac{\pi-\beta}{2}-\phi-\frac{\chi}{2}\right),\right. \quad (9)$$
$$\left. C_y+R\sin\chi-Q\sin\left(\frac{\pi-\beta}{2}-\phi-\frac{\chi}{2}\right)\right)$$

$$\mu = \frac{\pi-\beta}{2}-\phi$$

$$X(u) = C_x+\frac{1}{(1+u^2)^2}(R((1-u^2)^2-4u^2)+Q(1+u^2)(\cos(\rho)(1-u^2)+\sin(\rho)2u))$$

$$Y(u) = C_y+\frac{1}{(1+u^2)^2}(R4u(1-u^2)-Q(1+u^2)((1-u^2)\sin(\mu)-2u\cos(\mu)))$$

$$(\Delta X,\Delta Y)(\chi) = \left(\cos\left(\frac{\beta+\chi}{2}+\phi\right),\right.$$
$$\left.\sin\left(\frac{\beta+\chi}{2}+\phi\right)\right)$$

$$\Delta X(u) = \frac{1}{1+u^2}\left(\cos\left(\frac{\beta}{2}+\phi\right)(1-u^2)-\sin\left(\frac{\beta}{2}+\phi\right)2u\right)$$

$$\Delta Y(u) = \frac{1}{1+u^2}\left(\cos\left(\frac{\beta}{2}+\phi\right)2u+\sin\left(\frac{\beta}{2}+\phi\right)(1-u^2)\right)$$

$$J_E^R(u) = X(u)+(H-Y(u))\frac{\Delta X(u)}{\Delta Y(u)}$$

$$J_E^R(u) = \left(\frac{1}{(\cos(\mu)-2\sin(\mu)u+\cos(\mu)u^2)(1+u^2)^2}\right)$$

where $\phi$ refers to the interior angle between $E_{i,3}$ and $P_\chi E_{i,2}$ and Q refers to the minimum distance between $P_\chi$ and $E_{i,3}$. The range $<J_E^R>$ is computed by checking the boundaries (i.e., extremal orientations) of $$\left\{<\begin{array}{c}R_{i,3,l}\\\chi_{consistent}\end{array}>\right\}$$

as well as orientations corresponding to locally extremal x coordinates, i.e.

$$\frac{dJ_E^R(u)}{du}=0$$

(refer equation (11)). Notice there are at most two orientations u with locally extremal x coordinates since the numerator of $$\frac{dJ_E^R(u)}{du}$$

is a quadratic polynomial.

$$\frac{dJ_E^R(u)}{du} = \left(\frac{1}{(\cos(\mu) - 2\sin(\mu)u + \cos(\mu)u^2)}\right)^2 \begin{Bmatrix} u^6(C_x\cos(\mu) - \cos^2(\mu)Q + \cos(\mu)R - \\ C_y\sin(\mu) + H\sin(\mu) - Q\sin^2(\mu)) + \\ u^5(-2C_y\cos(\mu) + 2\cos(\mu)H - 2C_x\sin(\mu) + 2R\sin(\mu)) + \\ u^4(C_x\cos(\mu) - 3\cos^2(\mu)Q + \cos(\mu)R - \\ C_y\sin(\mu) + H\sin(\mu) - 3Q\sin^2(\mu)) + \\ u^3(-4C_y\cos(\mu) + 4\cos(\mu)H - 4C_x\sin(\mu) + 4R\sin(\mu)) + \\ u^2(-C_x\cos(\mu) - 3\cos^2(\mu)Q - \cos(\mu)R + \\ C_y\sin(\mu) - H\sin(\mu) - 3Q\sin^2(\mu)) + \\ u(-2C_y\cos(\mu) + 2\cos(\mu)H - 2C_x\sin(\mu) + 2R\sin(\mu)) + \\ C_x\cos(\mu) - \cos^2(\mu)Q - \cos(\mu)R + \\ C_y\sin(\mu) - H\sin(\mu) - Q\sin^2(\mu) \end{Bmatrix}$$ (10)

$$\begin{Bmatrix} u^2(2C_y\cos^2(\mu) - 2\cos^2(\mu)H + 2\cos^2(\mu)Q\sin(\mu) - \\ 4\cos(\mu)R\sin(\mu) + 2C_y\sin^2(\mu) - 2H\sin^2(\mu) + 2Q\sin^3(\mu)) + \\ u(4\cos^3(\mu)Q + 4\cos(\mu)Q\sin^2(\mu)) + 2(C_y\cos^2(\mu) - \\ \cos^2(\mu)H - \cos^2(\mu)Q\sin(\mu) - 2\cos(\mu)R\sin(\mu) + \\ C_y\sin^2(\mu) - H\sin^2(\mu) - Q\sin^3(\mu)) \end{Bmatrix}$$ (11)

Having computed the x and y ranges and associated orientation ranges for the third and fourth locator, processing proceeds to Step P100 wherein the pairs of positions for the third and fourth locator are enumerated.

To enumerate the pairs of positions for the third and fourth locator on the right jaw (Type I fixture), we use the ranges of x positions of the third and fourth locators relative to the origin on the left jaw. In enumerating third and fourth locator positions, the fact that the right jaw can move relative to the left jaw preferably should be taken into account. This is accomplished by computing the range of x differences between the ranges of x positions. Even though the x ranges $<J_{E_{i,3}}^R>$, $<J_{E_{i,4}}^R>$ were computed with respect to the left jaw, the differential between the x coordinate ranges $<J_{E_{i,3}}^R> \oplus <-J_{E_{i,4}}^R>$ for $E_{i,3}$ and $E_{i,4}$ remains valid with respect to the right jaw.

Figure 25:
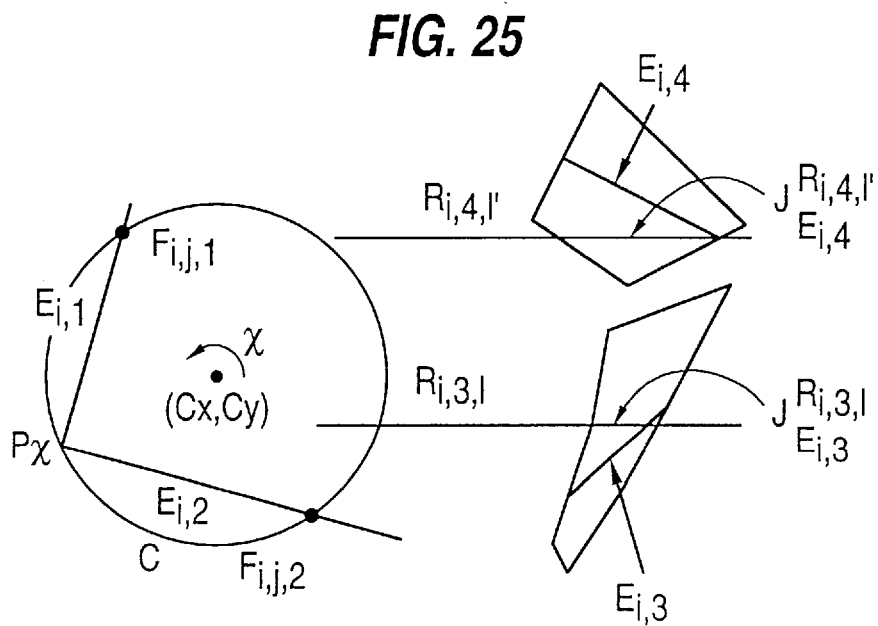
FIG. 25 illustrates the enumeration of pairs of positions for the third and fourth locator on the right jaw.

The first step involves intersecting the x ranges $\{<J_{E_{i,3}}^{R^{i,3,1'}}>\}$, $\{->J_{E_{i,4}}^{R^{i,4,1'}}>\}$ with the range <0,∞>; this describes that the locators on the right jaw must lie to the right of the first locator at the origin of the left jaw. Then we compute the difference of the resulting ranges $(\{<J_{E_{i,3}}^{R^{i,3,1'}}>\}\cap <0,\infty>)\oplus(-\{<J_{E_{i,4}}^{R^{i,4,1'}}>\}\cap <0,\infty>)$ (refer to FIG. 25). Again, we are using a shorthand notation where $(\{<J_{E_{i,3}}^{R^{i,3,1'}}>\}\cap <0,\infty>)$ refers to intersecting all of the ranges in the set $\{<J_{E_{i,3}}^{R^{i,3,1'}}>\}$ with <0,∞>, and $(\{<J_{E_{i,3}}^{R^{i,3,1'}}>\}\cap <0,\infty>)\oplus(-\{<J_{E_{i,4}}^{R^{i,4,1'}}>\}\cap <0,\infty>)$ refers to the set of ranges from pairwise combinations of the $(\{<J_{E_{i,3}}^{R^{i,3,1'}}>\}\cap <0,\infty>)$ and the set $(-\{<J_{E_{i,4}}^{R^{i,4,1'}}>\}\cap <0,\infty>)$.

For each discrete value $(k\lambda_{column} \in I;$ I being the set of integers) in the range, one of the third or fourth locators is assumed to be at the left most column x=0 on the right jaw, and the other is at column $|k|(x=|k|\lambda_{column})$ where $K\lambda$ column falls within the differential x coordinate range $(\{<J_{E_{i,3}}^{R^{i,3,1'}}>\}\cap <0,\infty>)\oplus(-\{<J_{E_{i,4}}^{R^{i,4,1'}}>\}\cap <0,\infty>)$.

Figure 26:
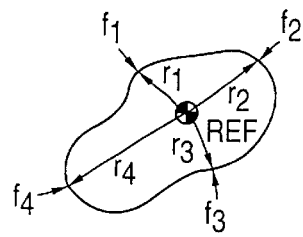
FIG. 26 illustrates an object constrained by four point contacts.

Before describing the computation of the workpiece's pose in Step P110, we will describe the form closure determination performed in Step P120. Form closure may be determined using the force sphere method discussed in the first method of operation. Alternatively, a different method may be employed. To understand the form closure determination of this second method, consider an object constrained by four point contacts as shown in FIG. 26. Forces at the four contact points induce four torques relative to an arbitrary reference point REF on the object. The torques τ correspond to the cross-products of the forces f with the lever arms $r_x$:

$$\tau = f \times r = f_x r_y - f_y r_x$$ (12)

where $f_x$ and $f_y$ are the x and y components of the force f.

Form closure in two dimensions, given four point contacts, can be verified with matrices. Consider the four x, y, τ point contact vectors: $(f_{1,x}, f_{1,y}, \tau_1)^T$, $(f_{2,x}, f_{2,y}, \tau_2)^T$, $(f_{3,x}, f_{3,y}, \tau_3)^T$, $(f_{4,x}, f_{4,y}, \tau_4)^T$ where $f_{i,x}$ represents the x component of the force and $f_{i,y}$ represents the y component of the force. We can construct a four by four matrix M consisting of the four contact vectors and four symbolic coefficients $\alpha_1$, $\alpha_2$, $\alpha_3$, $\alpha_4$ (see equation (13)):

$$M = \begin{bmatrix} \alpha_1 & \alpha_2 & \alpha_3 & \alpha_4 \\ f_{1,x} & f_{2,x} & f_{3,x} & f_{4,x} \\ f_{1,y} & f_{2,y} & f_{3,y} & f_{4,y} \\ \tau_1 & \tau_2 & \tau_3 & \tau_4 \end{bmatrix}$$ (13)

The four vectors positively span the three-dimensional x,y,θ force torque space if and only if the minors of $\alpha_i$ in M all have the same sign.

Consequently, in determining form closure in Step P120, processor 10 determines whether the minors associated with the four symbolic coefficients determined in Step P110 have the same sign. If the minors of the four symbolic coefficients have the same sign then form closure is achieved and processing proceeds to Step P130; otherwise, processing proceeds to Step P150.

At Step P110, the processor 10 computes the workpiece's poses such that edge segments $\vec{E}_i$ simultaneously contact locators $\vec{F}_{i,j,k}$. In other words, computing the workpiece's pose determines where the locators contact an edge of the workpiece. To compute the poses of simultaneous contact, the constraints are formulated algebraically. The method is based on the relative x displacements between contacts on the same fixture jaw. Each pair of contacts on the same jaw provides one such constraint, and we compute the workpiece's pose by intersecting two of these constraints.

Figure 27:
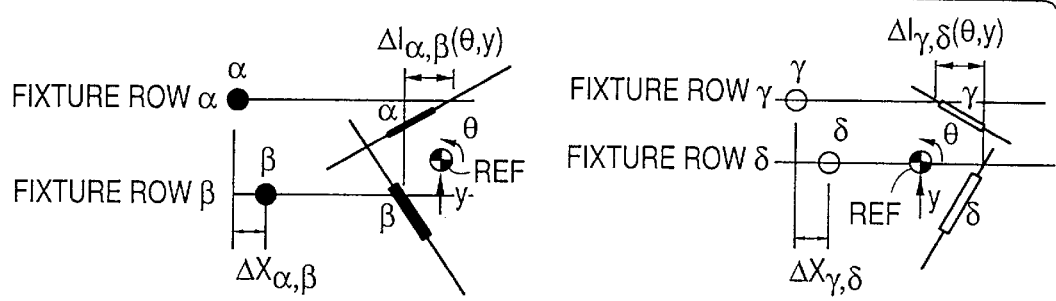
FIG. 27 illustrates the relative displacement between two contacts on the same jaw.

FIG. 27 illustrates the relative displacement between two contacts on the same jaw with respect to the arbitrary reference point REF. Each relative displacement specifies a curve C in (θ,y) pose configuration space. The contact pose is the intersection of two C curves. The C curves are determined by constant extended intersection difference G curves discussed in detail below. For the sake of brevity, only the G curves for the C curves related to locator positions α and β on fixture rows α and β, respectively, will be described. The G curves for the C curves related to locator positions γ and δ on fixture rows γ and δ, respectively, are easily discernable by one skilled in the art in view of the description below of the G curves for locator positions α and β.

Since we are trying to find the difference in x between two contacts, the poses are parameterized by θ and y. We formulate the difference in x between two contacts as a function of θ and y where (θ,y) represents the workpiece after a rigid two-dimensional transformation of rotation by θ and translation by y parallel to the y-axis both with respect to the arbitrary reference point REF; x is irrelevant since both jaws can translate freely along the x axis, and because relative x positions are used.

In both Type I and Type II situations, there are two independent relative displacements between contact points: in Type I situations, each jaw's pair of contacts supplies a relative displacement constraint, and in Type II situations, any two pairwise combination of contacts on the triple-contact jaw supply two relative displacement constraints. There are at most four poses for Type I contacts and two poses for Type II contacts. The poses which satisfy the relative displacement constraints are described by algebraic curves. These curves, called constant extended intersection difference G curves, are defined in terms of extended intersection difference functions, which, in turn, are defined in terms of extended intersection functions. Determining the G curves is relatively uncomplicated because the curves are of the special form:

$$y = \frac{g(t)}{(1+t^2)^2},$$

where $t=\tan(\theta/2)$
and $g(t)$ is a polynomial in $t$.

Figure 28:
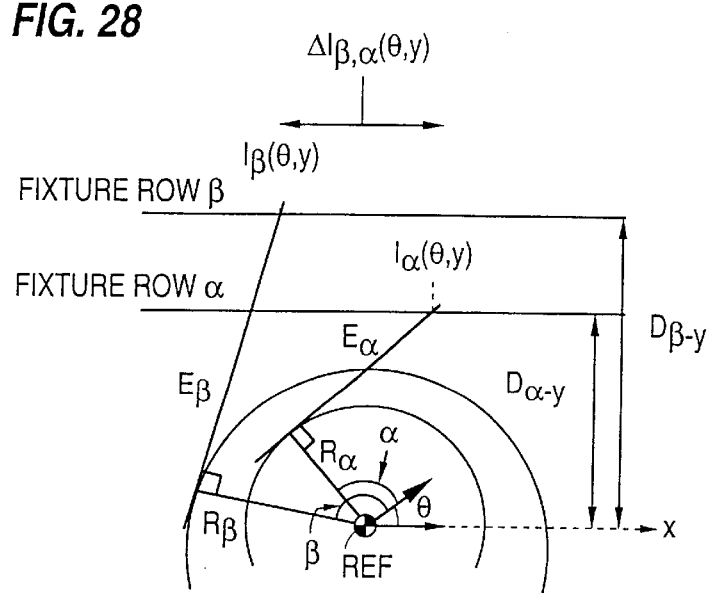
FIG. 28 illustrates the extended intersection functions.

Extended intersection functions, $I(\theta,y)$ algebraically describe the x coordinate of the extended intersection between a horizontal grid row and a corresponding edge $E_\alpha$ rotated around the reference point REF by $\theta$ and translated by y (see FIG. 28). Extended intersection functions $I(\theta,y)$ are related to $J_E$, the range of x coordinates swept by an edge along a row; the major distinction between these abstractions is that the extended intersections $I(\theta,y)$ are parameterized by $\theta$ and y, the workpiece's pose, whereas the row contacts $J_E^R$ were parameterized by $\chi$, the orientation of the extended intersection.

$I\alpha(\theta,y)$ is defined in equations (14) and (15) below:

$$I_\alpha(\theta, y) = R_\alpha\cos(\theta + \alpha) - \tan(\theta + \alpha)(D_\alpha - y - R_\alpha\sin(\theta + \alpha)) \quad (14)$$

$$= \frac{R_\alpha + (y - D_\alpha)\sin(\theta + \alpha)}{\cos(\theta + \alpha)}$$

$$= \frac{R_\alpha + (y - D_\alpha)(\sin\theta\cos\alpha + \cos\theta\sin\alpha)}{\cos\theta\cos\alpha - \sin\theta\sin\alpha}$$

$$I_\alpha(t, y) = \frac{R_\alpha(1+t^2) + (y-D_\alpha)(2t\cos\alpha + (1-t^2)\sin\alpha)}{(1-t^2)\cos\alpha - 2t\sin\alpha} \quad (15)$$

$$= \frac{y(-t^2\sin\alpha + 2t\cos\alpha + \sin\alpha)}{(1-t^2)\cos\alpha - 2t\sin\alpha} +$$

$$\frac{t^2(R_\alpha - D_\alpha\sin\alpha) - 2tD_\alpha\cos\alpha + R_\alpha + D_\alpha\sin\alpha}{(1-t^2)\cos\alpha - 2t\sin\alpha}$$

where $\alpha$ is the orientation normal to $E_\alpha$ pointing outward; $R_\alpha$ is the minimum distance from the reference point to $E_\alpha$; $D_\alpha$ is the difference in y coordinates between a row on the fixture jaw $\rho_\alpha$ and the reference point; and $t=\tan(\theta/2)$.

Extended intersection difference functions are defined in equations (16), (17) and illustrated in FIGS. 27 and 28.

$$\Delta I_{\beta,\alpha}(\theta, y) = I_\beta(\theta, y) - I_\alpha(\theta, y) \quad (16)$$

$$= \frac{R_\beta + (y - D_\beta)(\sin\theta\cos\beta + \cos\theta\sin\beta)}{\cos\theta\cos\beta - \sin\theta\sin\beta} -$$

$$\left(\frac{R_\alpha + (y - D_\alpha)(\sin\theta\cos\alpha + \cos\theta\sin\alpha)}{\cos\theta\cos\alpha - \sin\theta\sin\alpha}\right)$$

-continued $$\Delta I_{\beta,\alpha}(t, y) = \frac{y((1-t^2)\sin\alpha + 2t\cos\alpha)}{(1-t^2)\cos\alpha - 2t\sin\alpha} + \quad (17)$$

$$\frac{t^2(R_\alpha - D_\alpha\sin\alpha) - 2tD_\alpha\cos\alpha + R_\alpha + D_\alpha\sin\alpha}{(1-t^2)\cos\alpha - 2t\sin\alpha} -$$

$$\left(\frac{y((1-t^2)\sin\beta + 2t\cos\beta)}{(1-t^2)\cos\beta - 2t\sin\beta} + \right.$$

$$\left.\frac{t^2(R_\beta - D_\beta\sin\beta) - 2tD_\beta\cos\beta + R_\beta + D_\beta\sin\beta}{(1-t^2)\cos\beta - 2t\sin\beta}\right)$$

$G_{\beta,\alpha}$ curves characterize poses $(\theta,y)$ satisfying the constraint that the difference between the x coordinates of the intersections is exactly $\Delta_{\beta,\alpha}$ (the difference between $\beta$ and $\alpha$). These curves are defined as the roots of the constant extended intersection difference curves $G_{\beta,\alpha}(\theta,y)$ shown in equations (18) and (19) below. Since we want to arrive at a polynomial equation, and since we are only interested in the roots, we can remove the denominator of the rational equation by cross multiplying out the denominators.

$$G_{\beta,\alpha}(\theta, y) = (\Delta I_{\beta,\alpha}(\theta, y) - \Delta_{\beta,\alpha})(\cos\theta\cos\beta - \sin\theta\sin\beta) \quad (18)$$

$$(\cos\theta\cos\alpha - \sin\theta\sin\alpha)$$

$$G_{\beta,\alpha}(t, y) = (\Delta I_{\beta,\alpha}(t, y) - \Delta_{\beta,\alpha})((1-t^2)\cos\beta - 2t\sin\beta)$$

$$((1-t^2)\cos\alpha - 2t\sin\alpha)$$

$$= y(1+t^2)^2\sin(\alpha - \beta) -$$

$$\Delta_{\beta,\alpha}((1-t^2)\cos\alpha - 2t\sin\alpha)((1-t^2)\cos\beta - 2t\sin\beta) +$$

$$((1-t^2)\cos\beta - 2t\sin\beta)((1+t^2)(R_\alpha - D_\alpha\sin\alpha) -$$

$$2tD_\alpha\cos\alpha) +$$

$$((1-t^2)\cos\beta - 2t\sin\beta)y((1-t^2)\sin\alpha + 2t\cos\alpha) -$$

$$((1-t^2)\cos\alpha - 2t\sin\alpha)((1+t^2)(R_\beta - D_\beta\sin\beta) -$$

$$2tD_\beta\cos\beta) +$$

$$((1-t^2)\cos\alpha - 2t\sin\alpha)y((1-t^2)\sin\beta + 2t\cos\beta)$$

Interestingly, two of the terms involving y in $G_{\beta,\alpha}(t,y)$ cancel each other out, leaving only $\sin(\alpha-\beta)(1=t^2)^2$ (refer to equations 18 and 19). Consequently, we can separate the C curves to compute the intersections of two such curves.

$$((1-t^2)\cos\beta - 2t\sin\beta)((1-t^2)\sin\alpha + 2t\cos\alpha) = \quad (19)$$

$$((1-t^2)\cos\alpha - 2t\sin\alpha)((1-t^2)\sin\beta + 2t\cos\beta)$$

Next we describe the computation of the orientations t of intersections of constant extended intersection difference curves (without loss of generality, $G_{\beta,\alpha}(t,y)=0, G_{\delta,\gamma}(t,y)=0$). Observe that the ratio between the y contributions of these curves remains constant over all t. Let $G^{+y}$ refer to the y-independent components of C (refer to equation (20)). Cross multiplying the y-dependent and y-independent components of $G_{\beta,\alpha}$ and $G_{\delta,\gamma}$ (refer to equation (22)) and dividing out $y(1+t^2)^2$ produces a quartic expression which can be solved numerically.

$$G^{*y}_{\beta,\alpha}(t, y) = -\Delta_{\beta,\alpha}((1-t^2)\cos\alpha - 2t\sin\alpha)((1 - \quad (20)$$
$$t^2)\cos\beta - 2t\sin\beta) +$$

$$((1-t^2)\cos\beta - 2t\sin\beta)((1+t^2)(R_\alpha - D_\alpha\sin\alpha) - 2tD_\alpha\cos\alpha) -$$

$$((1-t^2)\cos\alpha - 2t\sin\alpha)((1+t^2)(R_\beta - D_\beta\sin\beta) - 2tD_\beta\cos\beta)$$

$$\underbrace{\sin(\alpha-\beta)y(1+t^2)^2 + G^{*y}_{\beta,\alpha}(t)}_{G_{\beta,\alpha}(t,y)} = 0 = \quad (21)$$

$$\underbrace{\sin(\gamma-\delta)y(1+t^2)^2 + G^{*y}_{\delta,\gamma}(t)}_{G_{\delta,\gamma}(t,y)}$$

$$\sin(\gamma-\delta)(\sin(\alpha-\beta)y(1+t^2)^2 + G^{*y}_{\beta,\alpha}(t)) = 0 = \quad (22)$$

$$\sin(\alpha-\beta)(\sin(\gamma-\delta)y(1+t^2)^2 + G^{*y}_{\delta,\gamma}(t)) - \sin(\alpha-\beta)G^{*y}_{\beta,\alpha}(t)) =$$

$$\sin(\gamma-\delta)\sin(\alpha-\beta)y(1+t^2)^2 = -\sin(\gamma-\delta)G^{*y}_{\delta,\gamma}(t))\sin(\alpha-\beta)G^{*y}_{\delta,\gamma}(t) -$$

$$\sin(\gamma-\delta)G^{*y}_{\beta,\alpha}(t) = 0$$

$$\Rightarrow a_4 t^4 + a_3 t^3 + a_2 t^2 + a_1 t + a_0 = 0$$

Prior to determining the y translation, the processor 10 computes the orientation t by solving equation (22). To do so, the processor 10 computes the five coefficients $a_0$, $a_1$, $a_2$, $a_3$, $a_4$ in equation (22) according to the following expressions:

$$a_4 = -(CCD\cos(\beta)\cos(\gamma)\cos(\delta)\sin(\alpha)) - \cos(\beta)\cos(\delta)R_\gamma\sin(\alpha) + \quad (23)$$
$$\cos(\beta)\cos(\gamma)R_\delta\sin(\alpha) + CCD\cos(\alpha)\cos(\gamma)\cos(\delta)\sin(\beta) +$$
$$\cos(\alpha)\cos(\delta)R_\gamma\sin(\beta) - \cos(\alpha)\cos(\gamma)R_\delta\sin(\beta) +$$
$$CAB\cos(\alpha)\cos(\beta)\cos(\delta)\sin(\gamma) + \cos(\beta)\cos(\delta)R_\alpha\sin(\gamma) -$$
$$\cos(\alpha)\cos(\delta)R_\beta\sin(\gamma) + \cos(\beta)\cos(\delta)D_\alpha\sin(\alpha)\sin(\gamma) -$$
$$\cos(\beta)\cos(\delta)D_\gamma\sin(\alpha)\sin(\gamma) - \cos(\alpha)\cos(\delta)D_\beta\sin(\beta)\sin(\gamma) +$$
$$\cos(\alpha)\cos(\delta)D_\gamma\sin(\beta)\sin(\gamma) - CAB\cos(\alpha)\cos(\beta)\cos(\gamma)\sin(\delta) -$$
$$\cos(\beta)\cos(\gamma)R_\alpha\sin(\delta) + \cos(\alpha)\cos(\gamma)R_\beta\sin(\delta) -$$
$$\cos(\beta)\cos(\gamma)D_\alpha\sin(\alpha)\sin(\delta) + \cos(\beta)\cos(\gamma)R_\beta\sin(\delta) +$$
$$\cos(\alpha)\cos(\gamma)D_\beta\sin(\beta)\sin(\delta) - \cos(\alpha)\cos(\gamma)D_\delta\sin(\beta)\sin(\delta)$$

$$a_3 = 2\cos(\beta)\cos(\gamma)\cos(\delta)D_\gamma\sin(\alpha) - 2\cos(\beta)\cos(\gamma)\cos(\delta)D_\delta\sin(\alpha) - \quad (24)$$
$$2\cos(\alpha)\cos(\gamma)\cos(\delta)D_\gamma\sin(\beta) + 2\cos(\alpha)\cos(\gamma)\cos(\delta)D_\delta\sin(\beta) -$$
$$2\cos(\alpha)\cos(\beta)\cos(\delta)D_\alpha\sin(\gamma) + 2\cos(\alpha)\cos(\beta)\cos(\delta)D_\beta\sin(\gamma) +$$
$$2CAB\cos(\beta)\cos(\delta)\sin(\alpha)\sin(\gamma) - 2CCD\cos(\beta)\cos(\delta)\sin(\alpha)\sin(\gamma) -$$
$$2\cos(\delta)R_\beta\sin(\alpha)\sin(\gamma) + 2\cos(\delta)R_\delta\sin(\alpha)\sin(\gamma) +$$
$$2CAB\cos(\alpha)\cos(\delta)\sin(\beta)\sin(\gamma) + 2CCD\cos(\alpha)\cos(\delta)\sin(\beta)\sin(\gamma) +$$
$$2\cos(\delta)R_\beta\sin(\beta)\sin(\gamma) - 2\cos(\alpha)R_\delta\sin(\beta)\sin(\gamma) +$$
$$2\cos(\delta)D_\alpha\sin(\alpha)\sin(\beta)\sin(\gamma) - 2\cos(\delta)D_\beta\sin(\alpha)\sin(\beta)\sin(\gamma) +$$
$$2\cos(\alpha)\cos(\beta)\cos(\gamma)D_\alpha\sin(\delta) - 2\cos(\alpha)\cos(\beta)\cos(\gamma)D_\beta\sin(\delta) -$$
$$2CAB\cos(\beta)\cos(\gamma)\sin(\alpha)\sin(\delta) - 2CCD\cos(\beta)\cos(\gamma)\sin(\alpha)\sin(\delta) +$$
$$2\cos(\gamma)R_\beta\sin(\alpha)\sin(\delta) - 2\cos(\beta)R_\gamma\sin(\alpha)\sin(\delta) -$$
$$2CAB\cos(\alpha)\cos(\gamma)\sin(\beta)\sin(\delta) + 2CCD\cos(\alpha)\cos(\gamma)\sin(\beta)\sin(\delta) -$$
$$2\cos(\gamma)R_\alpha\sin(\beta)\sin(\delta) + 2\cos(\alpha)R_\gamma\sin(\beta)\sin(\delta) -$$
$$2\cos(\gamma)D_\alpha\sin(\alpha)\sin(\beta)\sin(\delta) + 2\cos(\gamma)D_\beta\sin(\alpha)\sin(\beta)\sin(\delta) -$$
$$2\cos(\beta)D_\gamma\sin(\alpha)\sin(\gamma)\sin(\delta) + 2\cos(\beta)D_\delta\sin(\alpha)\sin(\gamma)\sin(\delta) +$$
$$2\cos(\alpha)D_\gamma\sin(\beta)\sin(\gamma)\sin(\delta) - 2\cos(\alpha)D_\delta\sin(\beta)\sin(\gamma)\sin(\delta)$$

$$a_2 = 2CCD\cos(\beta)\cos(\gamma)\cos(\delta)\sin(\alpha) - \quad (25)$$
$$2CCD\cos(\alpha)\cos(\gamma)\cos(\delta)\sin(\beta) - 2CAB\cos(\alpha)\cos(\beta)\cos(\delta)\sin(\gamma) -$$
$$2\cos(\beta)\cos(\delta)D_\gamma\sin(\alpha)\sin(\gamma) + 4\cos(\beta)\cos(\delta)D_\beta\sin(\alpha)\sin(\gamma) +$$
$$2\cos(\beta)\cos(\delta)D_\gamma\sin(\alpha)\sin(\gamma) - 4\cos(\beta)\cos(\delta)D_\delta\sin(\alpha)\sin(\gamma) -$$
$$4\cos(\alpha)\cos(\delta)D_\alpha\sin(\beta)\sin(\gamma) + 2\cos(\alpha)\cos(\delta)D_\beta\sin(\beta)\sin(\gamma) -$$
$$2\cos(\alpha)\cos(\delta)D_\gamma\sin(\beta)\sin(\gamma) + 4\cos(\alpha)\cos(\delta)D_\delta\sin(\beta)\sin(\gamma) +$$
$$4CAB\cos(\delta)\sin(\alpha)\sin(\beta)\sin(\gamma) + 2CAB\cos(\alpha)\cos(\beta)\cos(\gamma)\sin(\delta) +$$
$$2\cos(\beta)\cos(\gamma)D_\alpha\sin(\alpha)\sin(\delta) - 4\cos(\beta)\cos(\gamma)D_\beta\sin(\alpha)\sin(\delta) +$$
$$4\cos(\beta)\cos(\gamma)D_\gamma\sin(\alpha)\sin(\delta) - 2\cos(\beta)\cos(\gamma)D_\delta\sin(\alpha)\sin(\delta) +$$
$$4\cos(\alpha)\cos(\gamma)D_\alpha\sin(\beta)\sin(\delta) - 2\cos(\alpha)\cos(\gamma)D_\beta\sin(\beta)\sin(\delta) -$$
$$4\cos(\alpha)\cos(\gamma)D_\gamma\sin(\beta)\sin(\delta) + 2\cos(\alpha)\cos(\gamma)D_\delta\sin(\beta)\sin(\delta) -$$
$$4CAB\cos(\gamma)\sin(\alpha)\sin(\beta)\sin(\delta) - 4CCD\cos(\beta)\sin(\alpha)\sin(\gamma)\sin(\delta) +$$
$$4CCD\cos(\alpha)\sin(\beta)\sin(\gamma)\sin(\delta)$$

$$a_1 = -2\cos(\beta)\cos(\gamma)\cos(\delta)D_\gamma\sin(\alpha) + \quad (26)$$
$$2\cos(\beta)\cos(\gamma)\cos(\delta)D_\delta\sin(\alpha) + 2\cos(\alpha)\cos(\gamma)\cos(\delta)D_\gamma\sin(\beta) -$$
$$2\cos(\alpha)\cos(\gamma)\cos(\delta)D_\delta\sin(\beta) + 2\cos(\alpha)\cos(\beta)\cos(\delta)D_\alpha\sin(\gamma) -$$
$$2\cos(\alpha)\cos(\beta)\cos(\delta)D_\beta\sin(\gamma) - 2CAB\cos(\beta)\cos(\delta)\sin(\alpha)\sin(\gamma) +$$
$$2CCD\cos(\beta)\cos(\delta)\sin(\alpha)\sin(\gamma) - 2\cos(\delta)R_\beta\sin(\alpha)\sin(\gamma) +$$
$$2\cos(\beta)R_\delta\sin(\alpha)\sin(\gamma) - 2CAB\cos(\alpha)\cos(\delta)\sin(\beta)\sin(\gamma) -$$
$$2CCD\cos(\alpha)\cos(\delta)\sin(\beta)\sin(\gamma) + 2\cos(\delta)R_\alpha\sin(\beta)\sin(\gamma) -$$
$$2\cos(\alpha)R_\delta\sin(\beta)\sin(\gamma) - 2\cos(\delta)D_\alpha\sin(\alpha)\sin(\beta)\sin(\gamma) +$$
$$2\cos(\delta)D_\beta\sin(\alpha)\sin(\beta)\sin(\gamma) - 2\cos(\alpha)\cos(\beta)\cos(\gamma)D_\alpha\sin(\delta) +$$
$$2\cos(\alpha)\cos(\beta)\cos(\gamma)D_\beta\sin(\delta) + 2CAB\cos(\beta)\cos(\gamma)\sin(\alpha)\sin(\delta) +$$
$$2CCD\cos(\beta)\cos(\gamma)\sin(\alpha)\sin(\delta) + 2\cos(\gamma)R_\beta\sin(\alpha)\sin(\delta) -$$
$$2\cos(\beta)R_\gamma\sin(\alpha)\sin(\delta) + 2CAB\cos(\alpha)\cos(\gamma)\sin(\beta)\sin(\delta) -$$
$$2CCD\cos(\alpha)\cos(\gamma)\sin(\beta)\sin(\delta) - 2\cos(\gamma)R_\alpha\sin(\beta)\sin(\delta) +$$
$$2\cos(\alpha)R_\gamma\sin(\beta)\sin(\delta) + 2\cos(\gamma)D_\alpha\sin(\alpha)\sin(\beta)\sin(\delta) -$$
$$2\cos(\gamma)D_\beta\sin(\alpha)\sin(\beta)\sin(\delta) + 2\cos(\beta)D_\gamma\sin(\alpha)\sin(\gamma)\sin(\delta) -$$
$$2\cos(\beta)D_\delta\sin(\alpha)\sin(\gamma)\sin(\delta) - 2\cos(\alpha)D_\gamma\sin(\beta)\sin(\gamma)\sin(\delta) +$$
$$2\cos(\alpha)D_\delta\sin(\beta)\sin(\gamma)\sin(\delta)$$

$$a_0 = -(CCD\cos(\beta)\cos(\gamma)\cos(\delta)\sin(\alpha)) + \cos(\beta)\cos(\delta)R_\gamma\sin(\alpha) - \quad (27)$$
$$\cos(\beta)\cos(\gamma)R_\delta\sin(\alpha) + CCD\cos(\alpha)\cos(\gamma)\cos(\delta)\sin(\beta) -$$
$$\cos(\alpha)\cos(\delta)R_\gamma\sin(\beta) + \cos(\alpha)\cos(\gamma)R_\delta\sin(\beta) +$$
$$CAB\cos(\alpha)\cos(\beta)\cos(\delta)\sin(\gamma) - \cos(\beta)\cos(\delta)R_\alpha\sin(\gamma) +$$
$$\cos(\alpha)\cos(\delta)R_\beta\sin(\gamma) + \cos(\beta)\cos(\delta)D_\alpha\sin(\alpha)\sin(\gamma) -$$
$$\cos(\beta)\cos(\delta)D_\gamma\sin(\alpha)\sin(\gamma) - \cos(\alpha)\cos(\delta)D_\beta\sin(\beta)\sin(\gamma) +$$
$$\cos(\alpha)\cos(\delta)D_\gamma\sin(\beta)\sin(\gamma) - CAB\cos(\alpha)\cos(\beta)\cos(\gamma)\sin(\delta) +$$
$$\cos(\beta)\cos(\gamma)R_\alpha\sin(\delta) - \cos(\alpha)\cos(\gamma)R_\beta\sin(\delta) -$$
$$\cos(\beta)\cos(\gamma)D_\alpha\sin(\alpha)\sin(\delta) + \cos(\beta)\cos(\gamma)D_\delta\sin(\alpha)\sin(\delta) +$$
$$\cos(\alpha)\cos(\gamma)D_\beta\sin(\beta)\sin(\delta) - \cos(\alpha)\cos(\gamma)D_\delta\sin(\beta)\sin(\delta)$$

Where $CCD = F_{i,j,4}.x - F_{i,j,3}.x$; $CAB = F_{i,j,2}.x - F_{i,j,1}.x$ and $F_{i,j,k}.x$ is the x coordinate of locator $F_{i,j,k}$.

The y translation is then computed using $G_{\beta,\alpha}(t)$ or $G_{\delta,\gamma}(t)$. Namely, we determine the amount of y translation by using equation (18), setting $G_{\beta,\alpha}(t)$ and $G_{\delta,\gamma}(t)$ to zero, plugging in the orientation t determined according to equation (22) and solving for y. Then, we compute the separation using $\Delta I_{\delta,\alpha}(t,y)$ assuming the third locator position has x component 0 on the right jaw.

Having determined the orientation t (i.e., the angle through which the workpiece must be rotated from its present position) and the y translation (i.e., the amount to move the workpiece in the y direction), it is a simple matter to determine where the locators contact the workpiece. Using FIG. 27 as an example, after orientation and translation, the point on an edge is where the row having a locator intersects an edge. Thus, given the orientation t and translation y, the point where a locator contacts an edge is determined by the simple computation of intersecting two lines. It should be understood that no x translation needs to be calculated since the fixture jaws 210 and 211 are free to translate in the x direction.

As described in detail above, the processor 10 then determines form closure at Step P120 based on the minor of the four symbolic coefficients in equation (13).

Specifically, given the points where the locators contact the edges, the distances $r_i$ from the contact points to the reference point REF, such as illustrated in FIG. 26, are determined. Assuming a normal unit force applied at the contact points, the force in the x and y directions $f_{i,x}$ and $f_{i,y}$ is known. The torques $\tau_i$ are then calculated according to equation (12), and form closure is determined by checking the minors of the symbolic coefficients, as previously described, of matrix M in equation (13).

If form closure is not achieved, processing proceeds to Step P150. If form closure is achieved, then at Step P130 it is determined whether the fixture design meets or can be adjusted to meet certain fixture limits. The fixture limits can include positional constraints or physical limitations of the fixture vise. The following discusses examples of possible positional constraints. The possible positional constraints, however, are not limited to those examples discussed. While the fixture design is designed with the first locator positioned at the origin of the left jaw, a fixture limit may require shifting the position of the fixture design on the fixture vise. Thus, the processor 10 will determine whether such a shift is feasible (e.g., determine if holes exist on the fixture vise at the shifted position). Shifting the position of the fixture design includes moving the fixture design in the x and/or y directions and/or rotating the fixture design.

Another fixture limit may require some minimum and/or maximum spacing between the fixture jaws. Again, the processor 10 will determine if such a fixture limit is met. As discussed in detail below, one modification of the present invention provides for shifting the position of the fixture design to meet this fixture limit.

A still further fixture limit may require that certain locators fall within certain rows or columns on the jaws of the fixture vise. One modification would be for the processor 10 to reposition the fixture design (e.g., rotate fixture design 180 degrees) and/or move the jaws of the fixture vise to meet these constraints.

If the fixture design does fall within the fixture limits, then processing proceeds to Step P140; otherwise, processing proceeds to Step P150. At Step P140, the processor 10 adds the admissible fixture design to the set of admissible fixture designs, and processing proceeds to Step P150.

At Step P150, the processor 10 determines whether another pose of the workpiece exists. If so, then processing returns to Step P120 with respect to the another pose; otherwise, processing proceeds to Step P160.

At Step P160, the processor 10 determines whether another pair of third and fourth locator positions exist. If so, then processing proceeds to Step P110 with respect to the another pair of third and fourth locator positions; otherwise, processing proceeds to Step P170.

At Step P170, the processor 10 determines whether another second locator position exists. If so, then processing proceeds to Step P70 with respect to the another second locator position; otherwise, processing proceeds to Step P180.

At Step P180, the processor 10 determines whether another consistent orientation range exists. If so, then processing proceeds to Step P80 with respect to the another orientation range; otherwise, processing proceeds to Step P190.

At Step P190 the processor 10 determines whether another edge quartet exists. If so, then processing proceeds to Step P40 with respect to the another edge quartet; otherwise, processing proceeds to Step P200.

After generating the complete set of admissible fixture designs, the admissible fixture designs are ranked according to a scalar metric at Step P200. An automatically developed default quality metric may be used that favors fixtures which can resist expected applied forces without generating excessive contact forces. Large contact forces are generally undesirable because they may deform the part. This function was described in detail with respect to Step S230 of the first method, and, therefore, will not be repeated. At Step P210, the optimal fixture determined by the ranking Step P200 is either manually or automatically located on the fixture plate.

FIG. 29 illustrates the flow chart for determining Type II fixtures according to the second method of operation. This flow chart only differs from the flow chart in FIG. 15 in that Steps P90–P110 and P160 of FIG. 15 have been replaced by Steps P300–P310 and P320, respectively, in FIG. 29. Therefore, only these differences will be discussed. The x and y ranges and associated orientation ranges for the third locator are determined in Step P80.

As discussed previously, with a Type II fixture, since the third locator is on the left jaw, we only need to compute $<J_{E_{i,3}}^{R^{i,3,1}}>$ in Step P80. The set of possible $F_{i,3}$ locator positions are the lattice points $k\lambda_{column}\epsilon < J_{E_{i,3}}^{R^{i,3,3}}>$, $(k\epsilon I)$ along rows $R_{i,3,1}$. Then in Step P300, the poses of simultaneous contact between the three edges and a set of first, second, and third locator positions are calculated. Step P300 is performed according to the methodology discussed above with respect to Step P110 in FIG. 15. Alternatively, the methodology discussed previously with respect to Step S70 in FIG. 3 could be used.

Next in Step 310 the number of rows on the right fixture jaw crossed by the fourth edge are determined. After Step P300, the position of the workpiece is fixed. Accordingly, the possibly fourth locator positions are those which lie on rows of the right fixture jaw crossed by the fourth edge. One skilled in the art will appreciate that whether the fourth locator is positioned on the first or second column of a row does not change the fixture design, only the displacement of the right fixture jaw from the left fixture jaw.

Since, in the flow chart of FIG. 29, Step P100 of FIG. 15 has been replaced, Step P160 also had to be replaced. Accordingly after Step P150, in the flow chart of FIG. 29, processing proceeds to Step P320. At Step P320, the processor 10 determines whether another third locator position exists. If so, then processing returns to Step P300 with respect to the another third locator position; otherwise, processing proceeds to Step 170.

We will now explore various modifications of the present invention which can be used to speed up fixture design. Various heuristics can be used to speed up fixture design time by exploiting the actual fixture vise constraints. These constraints are usually of the form: each grid on the fixture vise only includes so many columns, or so many rows; or the separation between the fixture jaws is limited by some minimal and maximal amounts.

One method of achieving a separation of the fixture jaws within the desired range <minSpacing,maxSpacing> for configurations with separations that exceed the maxSpacing is to shift the locator contacts outward on the fixture jaws, to decrease the separation. For instance, suppose the fixture jaws each have three columns, and the current locator positions for the Type I configuration are (−10,20),(0,10) on the left jaw 211 and (0,30),(10,0) on the right jaw 210, and the separation is 25. Furthermore, assume that maxSpacing is 10. To satisfy the maxSpacing constraint, we can modify the contact peg positions to be (−20,20), (−10,10) on the left jaw and (10,30), (20,0) on the right fixture jaw 210, leaving us with a separation of 5.

Limiting the size of the fixture jaw grid corresponds to imposing relative positional constraints on the contact points. For instance, if each fixture jaw has only one column of holes, then for Type I configurations, the orientation must be such that the x projections of the two left edges overlap and the x projections of the two right edges overlap. In other words, the orientation is constrained so that at least one point on left edge1 must have the same x coordinate as a point on left edge2.

If each fixture jaw has two columns of holes, then the x projections of the two right edges must be separated by at most deltaX and the x projections of the two right edges must be separated by at most deltaX. The max separation of deltaX corresponds to one contact point of an edge being on the left column and the other contact point of the other edge being on the right column (and the spacing between the columns being deltaX). Given the first contact, these ranges of possible locator positions for the other contacts are constrained to lie in rectangles due to the (min,max) nature of the constraints.

There are also two types of pruning strategies: constraining the second, third, and fourth locator positions, and refining the valid orientations $\theta_{consistent}$. We describe the constraints on the fixture positions first because they are more intuitive.

The first strategy involves ignoring positions of the second, third and fourth locators which do not satisfy the relative positional constraints. This results in ignoring (not computing) extraneous configuration which do not satisfy the actual grid constraints.

These constraints are incorporated into the enumeration functions in three ways: by not enumerating second locator positions, by ignoring (not checking) rows which are outside the constraints (recall that first we enumerate the feasible rows, and then the lattice points along each row), and by ignoring (not enumerating) lattice points along the rows which are inconsistent with the constraints.

The second strategy involves modifying the computation of the valid orientations $\{<\theta_{consistent}>\}$ of form closure contact configurations. In other words, the fixture table constraints can be used to shrink the set of valid orientations: $\{<\theta_{consistent}>\}$. The crux of this approach is that we are looking for orientations which satisfy relative positional constraints between points on different edges.

Therefore, the constraints for $\{<\theta_{consistent}>\}$ are of the form: for a given orientation θ to be valid, at least one point on an edge (edge 2) rotated around the origin by θ must lie within a rectangle of another point on another edge (edge 1) rotated around the origin by θ. This problem reduces to finding orientations for which the second edge intersects the area of the Minkowski sum of the first edge and the rectangle. The Minkowski sum is a well known algebraic concept and is defined as : c ∈ A+B iff ∃a,b s.t. c=a+b where a∈A, b∈B.

Our approach to this problem is to enumerate all critical orientations for which a vertex of edge2 touches the Minkowski sum of the first edge and the rectangle, and enumerate all ranges (bounded by critical orientations) for which the constraint is satisfied. As discussed above, the constraint is of the form: edge2 overlaps the Minkowski sum of edge1 and the rectangle. Since the Minkowski sum is contained within an easily describable bounding box, bounding box tests are used to quickly reject invalid orientations.

There are two different types of critical orientations. The first type correspond to the orientations for which x ordinates or y ordinates of vertices of different edges differ by exactly the x and y positions of the rectangle's corners. The second type corresponds to the orientations for which the sum of one vertex and the vector from the origin to a rectangle corner contacts the other edge.

For the unconstrained infinite fixture vise, computing the orientation ranges only entailed computing the orientations for which some points on the right edges lie to the left of some points on the left edges.

Computing the constrained orientation ranges takes much more time because it is much more complicated. For this reason, the computed orientation ranges are saved in an array table. This improves performance because there are only $O(n^2)$ different calls to compute the orientation range consistent with two edges (where n is the number of edges), but a total of $O(^4)$ calls are made.

Storing orientation ranges improves performance because for each pair of edges, there are only two relative positional ranges we can ever expect to see. These correspond to both edges being on the same fixture jaw (and therefore the function sees a range of the form: X:<−(numColumns−1)*deltaX, (numColumns−1) *deltaX>,Y:<−(numRows−1)*deltaY, (numRows 1)*deltaY>). When the edges occur on different fixture jaws (edge1 on the left jaw, and edge2 on the right jaw), and the function sees a range of the form: X:<minSpacing,2*(numColumns−1)*deltaX+maxSpacing>Y:<−(numRows−1)*deltaY, (numRows−1)*deltaY>.

Only two sets of orientation ranges for each pair of edges have to be stored. Furthermore, given that the range of relative positions is known to correspond to both edges being on the same jaw or different jaws, the orientation ranges corresponding to the pair of edges given in reverse order can be computed. For instance, the set of order ranges for edge2,edge1 is exactly equal to the set of order ranges for edge1,edge2 for the same jaw case, and the set of order ranges for edge2,edge1 is exactly the set of order ranges for edge1,edge2 transposed by π for the opposite jaw case.

Additionally, the set of admissible fixture designs is produced in an amount of time dependent upon the complexity of the workpiece. However, based on the ranking, many design fixtures may be produced with very similar quality scores. Thus, a sub-set of the complete set of admissible fixture designs may still lead to a very high quality fixture design. The number of admissible fixture designs produced are primarily dependent upon the size of the workpiece with respect to the array of holes on the fixture jaws. When the array of holes is coarse, fewer designs are produced which reduces the execution time period. As a result, a grid step parameter may be used in the quality metric which allows the amount of time to be reduced if a more coarse array of holes is input. Accordingly, a method of interactively producing fixture designs may be used by first inputting a coarse array of holes and then refining the resolution so that a quick fixture design is obtained in a short amount of time and then a subsequent, refined fixture design may be obtained by a more refined resolution.

The fixture design processes have been discussed with respect to fixture designs for modular components but this process may also be used to design dedicated fixtures. Modular fixturing components are somewhat more expensive than dedicated tooling, which makes dedicated tooling preferable in mass production environments where multiple copies of the fixture are used for a large number of cycles. In mass production situations, the fixture process could be used to produce fixture designs which are then fabricated with a plane tooling plate. Because the major costs of modular fixturing components is in the precisely machined fixture table, cost effective fixture designs can be achieved in this manner. This approach also has the additional advantage that product type fixtures can be built from modular components for initial testing purposes.

Furthermore, both the first and second methods of operation assume a frictionless point contact model in determining form closure, other models, however, may be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A modular fixturing system, comprising:
    a fixture vise;
    first and second fixture jaws disposed on said fixture vise capable of being translated in a planar direction with respect to one another, said first and second fixture jaws including an array of holes separated by a predetermined distance for receiving at least first, second, third and fourth locators therein which contact a workpiece;
    a fixture processor for generating, without human assistance, a set of admissible fixture designs which provide form closure based on geometric access constraints of said workpiece.

2. A modular fixturing system according to claim 1, wherein said fixture processor generates admissible fixture designs having said first locator and said second locator on said first fixture jaw, and said third locator and said fourth locator on said second fixture jaw.

3. A modular fixturing system according to claim 2, wherein said fixture processor comprises:
    first enumerating means for enumerating positions on said first fixture jaw for said first locator and said second locator;
    bounding means for determining a boundary constraint indicative of limits on possible third and fourth locator positions based on one set of first and second locator positions;
    second enumerating means for enumerating positions on said second fixture jaw for said third locator and said fourth locator based on said boundary constraint;
    pose enumerating means for enumerating poses of said workpiece based on one set of said first, second, third, and fourth locator positions; and
    analyzing means for determining whether said set of said first, second, third and fourth locator positions and one of said poses of said workpiece form a fixture design achieving form closure.

4. A modular fixturing system according to claim 3, wherein said bounding means parameterizes a pose of said workpiece as said boundary constraint based on said one set of said first and second locator positions.

5. A modular fixturing system according to claim 3, wherein said parameterizing means parameterizes said pose of said workpiece by determining an extended intersection of edges of said workpiece which contact said first and second locator.

6. A modular fixturing system according to claim 4, wherein said fixture processor further comprises:
    computing means for computing left/right constraints for at least a quartet of edges of said workpiece, said left/right constraints being workpiece pose constraints such that an edge of said workpiece contacting one of said first, second, third and fourth locator on a left one of said first and second fixture jaws does not lie entirely to the right of an edge of said workpiece contacting one of said first, second, third and fourth locator on a right one of said first and second fixture jaws; and wherein
    said first enumerating means enumerates positions of said second locator based on said left/right constraints; and
    said bounding means determines said boundary constraint based on said one set of said first and second locator positions, and said left/right constraints.

7. A modular fixturing system according to claim 3, wherein said second enumerating means first computes ranges in a first and second direction for possible positions of said third locator, second computes ranges in said first and second direction for possible positions of said fourth locator, and enumerates pairs of positions for said third and fourth locator based on said ranges determined in said first and second computing, said first and second direction are directions in which said holes are arrayed.

8. A modular fixturing system according to claim 3, wherein said pose enumerating means enumerates poses of said workpiece so that edges of said workpiece simultaneously contact said first, second, third and fourth locator, and wherein said pose enumerating means enumerates poses based on a relative displacement in a first direction between a pair of said first, second, third and fourth locators positioned on a same one of said first and second fixture jaw.

9. A modular fixturing system according to claim 3, wherein said fixture processor further comprises fixture filtering means for checking spacing limits between said first and second fixture jaw and for determining whether fixture designs achieving form closure fall within said spacing limits so that a set of admissible fixture designs is obtained.

10. A modular fixture design processor according to claim 3, further comprising ranking means for ranking the set of admissible fixture designs according to a predetermined quality metric for the workpiece.

11. A modular fixture system according to claim 10, wherein said predetermined quality metric allows the set of admissible fixture designs to be ranked by estimating a maximum contact reaction force required to resist said expected applied forces within said geometric access constraints.

12. A modular fixturing system according to claim 1, wherein said fixture processor generates admissible fixture designs having said first locator, said second locator and said third locator on said first fixture jaw, and said fourth locator on said second fixture jaw.

13. A modular fixturing system according to claim 3, wherein said fixture processor comprises:
   first enumerating means for enumerating positions on said first fixture jaw for said first, second and third locator;
   pose enumerating means for enumerating poses of said workpiece such that edges of said workpiece simultaneously contact said first, second and third locator based on one set of said first, second, and third locator positions;
   second enumerating means for enumerating positions of said fourth locator on said second fixture jaw based on said one set of said first, second and third locator positions and one of said poses of said workpiece; and
   analyzing means for determining whether said set of said first, second, third and fourth locator positions and said one of said poses of said workpiece form a fixture design achieving form closure.

14. A modular fixturing system according to claim 13, wherein said first enumerating means comprises:
   first and second locator enumerating means for enumerating positions on said first fixture jaw for said first and second locator;
   bounding means for determining a boundary constraint indicative of limits on possible third locator positions based on one set of first and second locator positions; and
   third locator enumerating means for enumerating positions on said first fixture jaw for said third locator based on said boundary constraint.

15. A modular fixturing system according to claim 1, wherein said fixture processor generates a set of admissible fixture designs which provide form closure based on said geometric access constraints of said workpiece and expected applied forces on said workpiece.

16. A modular design fixture processor for developing a set of admissible fixture designs on a fixture vise for a workpiece with first, second, third and fourth locators, said fixture vice including first and second fixture jaws disposed on said fixture vice capable of being translated in a planar direction, said first and second fixture jaws including an array of holes separated by a predetermined distance for receiving at least first, second, third and fourth locators therein which contact said workpiece, said processor comprising:
   first enumerating means for enumerating positions on said first fixture jaw for said first locator and said second locator;
   bounding means for determining a boundary constraint indicative of limits on possible third and fourth locator positions based on one set of first and second locator positions;
   second enumerating means for enumerating positions on said second fixture jaw for said third locator and said fourth locator based on said boundary constraint;
   pose enumerating means for enumerating poses of said workpiece based on one set of said first, second, third, and fourth locator positions; and
   analyzing means for determining whether said set of said first, second, third and fourth locator positions and one of said poses of said workpiece form a fixture design achieving form closure.

17. A modular design fixture processor according to claim 16, wherein said bounding means parameterizes a pose of said workpiece as said boundary constraint based on said one set of said first and second locator positions.

18. A modular design fixture processor according to claim 17, wherein said parameterizing means parameterizes said pose of said workpiece by determining an extended intersection of edges of said workpiece which contact said first and second locator.

19. A modular design fixture processor according to claim 16, wherein said fixture processor further comprises:
   computing means for computing left/right constraints for at least a quartet of edges of said workpiece, said left/right constraints being workpiece pose constraints such that an edge of said workpiece contacting one of said first, second, third and fourth locators on a left one of said first and second fixture jaws does not lie entirely to the right of an edge of said workpiece contacting one of said first, second, third and fourth locators on a right one of said first and second fixture jaws and wherein
   said first enumerating means enumerates positions of said second locator based on said left/right constraints; and
   said bounding means determines said boundary constraint based on said one set of said first and second locator positions, and said left/right constraints.

20. A modular design fixture processor according to claim 16, wherein said second enumerating means first computes ranges in a first and second direction for possible positions of said third locator, second computes ranges in said first and second direction for possible positions of said fourth locator, and enumerates pairs of positions for said third and fourth locator based on said ranges determined in said first and second computing, said first and second direction are directions in which said holes are arrayed.

21. A modular design fixture processor according to claim 16, wherein said pose enumerating means enumerates poses of said workpiece so that edges of said workpiece simultaneously contact said first, second, third and fourth locator, and wherein said pose enumerating means enumerates poses based on a relative displacement in a first direction between a pair of said first, second, third and fourth locators positioned on a same one of said first and second fixture jaw.

22. A modular design fixture processor according to claim 16, further comprising fixture filtering means for checking spacing limits between said first and second fixture jaw and for determining whether fixture designs achieving force closure fall within said spacing limits so that a set of admissible fixture designs is obtained.

23. A modular fixture design processor according to claim 16, further comprising ranking means for ranking the set of admissible fixture designs according to a predetermined quality metric for the workpiece.

24. A modular fixture design processor according to claim 23, wherein said predetermined quality metric allows the set of admissible fixture designs to be ranked by estimating a maximum contact reaction force required to resist said expected applied forces within said geometric access constraints.

25. A method of designing modular fixtures according to claim 24, wherein step (b3) includes the steps of:
   (b31) computing ranges in a first and second direction for possible positions of said third locator;
   (b32) computing ranges in said first and second direction for possible positions of said fourth locator; and
   (b33) enumerating pairs of positions for said third and fourth locator based on said ranges determined in steps (b31) (b32), said first and second direction are directions in which said holes are arrayed.

26. A method of designing modular fixtures, comprising:
   (a) providing a fixture vise with first and second fixture jaws disposed thereon which are capable of being translated in a planar direction with respect to one another, said first and second fixture jaws including an array of holes separated by a predetermined distance for receiving first, second, third and fourth locators therein which contact a workpiece; and (b) generating, using a processor and without human intervention, a set of admissible fixture designs which provide form closure based on geometric access constraints of said workpiece.

27. A method of designing modular fixtures according to claim 25, wherein step (b) generates a set of admissible fixture designs which provide form closure based on said geometric access constraints of said workpiece and expected applied forces on said workpiece.

28. A method of designing modular fixtures according to claim 25, wherein step (b) comprises:

(b1) enumerating positions on said first fixture jaw for said first, second and third locator;

(b2) enumerating poses of said workpiece such that edges of said workpiece simultaneously contact said first, second and third locator based on one set of said first, second, and third locator positions; and (b3) enumerating positions of said fourth locator on said second fixture jaw based on said set of said first, second and third locator positions and one of said poses of said workpiece; and (b4) determining whether said set of said first, second, third and fourth locator positions and said one of said poses of said workpiece form a fixture design achieving form closure.

29. A method of designing modular fixtures according to claim 28, wherein said step (b1) comprises:

(b11) enumerating positions on said first fixture jaw for said first and second locator;

(b12) determining a boundary constraint indicative of limits on possible third locator positions based on said one set of first and second locator positions; and (b13) enumerating positions on said first fixture jaw for said third locator based on said boundary constraint.

30. A method of designing modular fixtures according to claim 26, wherein step (b) generates admissible fixture designs having said first locator, said second locator and said third locator on said first fixture jaw, and said fourth locator on said second fixture jaw.

31. A method of designing modular fixtures according to claim 26, wherein step (b) generates admissible fixture designs having said first locator and said second locator on said first fixture jaw, and said third locator and said fourth locator on said second fixture jaw.

32. A method of designing modular fixtures according to claim 26, wherein step (b) comprises:

(b1) enumerating positions on said first fixture jaw for said first locator and said second locator;

(b2) determining a boundary constraint indicative of limits on possible third and fourth locator positions based on one set of first and second locator positions;

(b3) enumerating positions on said second fixture jaw for said third locator and said fourth locator based on output of step (b2);

(b4) enumerating poses of said workpiece based on one set of said first, second, third, and fourth locator positions; and (b5) determining whether said set of said first, second, third and fourth locator positions and one of said poses of said workpiece form a fixture design achieving form closure.

33. A method of designing modular fixtures according to claim 31, wherein said step (b2) parameterizes a pose of said workpiece as said boundary constraint based on said one set of said first and second locator positions.

34. A method of designing modular fixtures according to claim 32, wherein said step (b2) parameterizes said pose of said workpiece by determining an extended intersection of edges of said workpiece which contact said first and second locator.

35. A method of designing modular fixtures according to claim 31, further comprising the step of:

(b6) computing left/right constraints for at least a quartet of edges of said workpiece, said left/right constraints being workpiece pose constraints such that an edge of said workpiece contacting one of said first, second, third and fourth locators on a left one of said first and second fixture jaws does not lie entirely to the right of an edge of said workpiece contacting one of said first, second, third and fourth locators on a right one of said first and second fixture jaws; and wherein said step (b1) enumerates positions of said second locator based on said left/right constraints; and said step (b2) determines said boundary constraint based on said one set of said first and second locator positions, and said left/right constraints.

36. A method of designing modular fixtures according to claim 31, wherein step (b4) enumerates poses of said workpiece so that edges of said workpiece simultaneously contact said first, second, third and fourth locator, and wherein step (b4) enumerates poses based on a relative displacement in a first direction between a pair of said first, second, third and fourth locators positioned on a same one of said first and second fixture jaw.

37. A method of designing modular fixtures according to claim 31, further comprising:

(b6) checking spacing limits between said first and second fixture jaw; and (b7) determining whether fixture designs achieving form closure fall within said spacing limits so that a set of admissible fixture designs is obtained.

38. A method of designing modular fixtures according to claim 28, further comprising (b6) ranking the set of admissible fixture designs according to a predetermined quality metric for the workpiece.

39. A method of designing modular fixtures according to claim 38, wherein said predetermined quality metric allows the set of admissible fixture designs to be ranked by estimating a maximum contact reaction force required to resist said expected applied forces within said geometric access constraints.

40. A method for developing modular fixtures on a fixture vise for a workpiece with first, second, third and fourth locators, said fixture vise including first and second fixture jaws disposed thereon which are capable of being translated in a planar direction, said first and second fixture jaws including an array of holes separated by a predetermined distance for receiving first, second, third and fourth locators therein which contact said workpiece, comprising:

(a) enumerating positions on said first fixture jaw for said first locator and said second locator using a processor;

(b) determining a boundary constraint indicative of limits on possible third and fourth locator positions based on one set of first and second locator positions using said processor;

(c) enumerating positions on said second fixture jaw for said third locator and said fourth locator based on output of step (b) using said processor;

(d) enumerating poses of said workpiece based on one set of said first, second, third, and fourth locator positions using said processor; and (e) determining whether said set of said first, second, third and fourth locator positions and one of said poses of said workpiece form a fixture design achieving form closure using said processor.

41. A method for developing modular fixtures according to claim 40, wherein said step (b) parameterizes a pose of said workpiece as said boundary constraint based on said one set of said first and second locator positions.

42. A method for developing modular fixtures according to claim 39, wherein said step (b) parameterizes said pose of said workpiece by determining an extended intersection of edges of said workpiece which contact said first and second locator.

43. A method for developing modular fixtures according to claim 41, further comprising the step of:

(f) computing left/right constraints for at least a quartet of edges of said workpiece, said left/right constraints being workpiece pose constraints such that an edge of said workpiece contacting one of said first, second, third and fourth locators on a left one of said first and second fixture jaws does not lie entirely to the right of an edge of said workpiece contacting one of said first, second, third and fourth locators on a right one of said first and second fixture jaws; and wherein said step (a) enumerates positions of said second locator based on said left/right constraints; and said step (b) determines said boundary constraint based on said one set of said first and second locator positions, and said left/right constraints.

44. A method for developing modular fixtures according to claim 40, wherein step (c) includes the steps of:

(c1) computing ranges in a first and second direction for possible positions of said third locator;

(c2) computing ranges in said first and second direction for possible positions of said fourth locator; and (c3) enumerating pairs of positions for said third and fourth locator based on said ranges determined in steps (c2) and (c3), said first and second direction are directions in which said holes are arrayed.

45. A method for developing modular fixtures according to claim 40, wherein step (d) enumerates poses of said workpiece so that edges of said workpiece simultaneously contact said first, second, third and fourth locator, and wherein step (d) enumerates poses based on a relative displacement in a first direction between a pair of said first, second, third and fourth locators positioned on a same one of said first and second fixture jaw.

46. A method for developing modular fixtures according to claim 40, further comprising:

(f) checking spacing limits between said first and second fixture jaw; and (g) determining whether sets of first, second, third, and fourth locator positions will fit on said fixture vise based on results of said step (f) so that a set of admissible fixture designs is obtained.

47. A method of developing modular fixtures according to claim 40, further comprising (f) ranking the set of admissible fixture designs according to a predetermined quality metric for the workpiece.

48. A method of developing modular fixtures according to claim 47, wherein said predetermined quality metric allows the set of admissible fixture designs to be ranked by estimating a maximum contact reaction force required to resist said expected applied forces within said geometric access constraints.

49. A modular design fixture processor for developing a set of admissible fixture designs on a fixture vise for a workpiece with first, second, third and fourth locators, said fixture vise including first and second fixture jaws disposed thereon which are capable of being translated in a planar direction, said first and second fixture jaws including an array of holes separated by a predetermined distance for receiving at least first, second, third and fourth locators therein which contact a workpiece, said processor comprising:

first enumerating means for enumerating positions on said first fixture jaw for said first, second and third locator;

pose enumerating means for enumerating poses of said workpiece such that edges of said workpiece simultaneously contact said first, second and third locator based on one set of said first, second, and third locator positions; and second enumerating means for enumerating positions of said fourth locator on said second fixture jaw based on said one set of said first, second and third locator positions and one of said poses of said workpiece; and analyzing means for determining whether said set of said first, second, third and fourth locator positions and said one of said poses of said workpiece form a fixture design achieving form closure.

50. A modular design fixture processor according to claim 49, further comprising fixture filtering means for checking spacing limits between said first and second fixture jaw and for determining whether fixture design achieving form closure fall within said spacing limits so that a set of admissible fixture designs is obtained.

51. A method for developing modular fixtures on a fixture vise for a workpiece with first, second, third and fourth locators, said fixture vise including first and second fixture jaws disposed thereon which are capable of being translated in a planar direction, said first and second fixture jaws including an array of holes separated by a predetermined distance for receiving first, second, third and fourth locators therein which contact said workpiece, comprising:

(a) enumerating positions on said first fixture jaw for said first, second and third locator using a processor;

(b) enumerating poses of said workpiece such that edges of said workpiece simultaneously contact said first, second and third locator based on one set of said first, second, and third locator positions using said processor;

(c) enumerating positions of said fourth locator on said second fixture jaw based on said one set of said first, second and third locator positions and one of said poses of said workpiece using said processor; and (d) determining whether said set of said first, second, third and fourth locator positions and said one of said poses of said workpiece form a fixture design achieving form closure using said processor.

52. A method for developing modular fixtures according to claim 51, further comprising:

(e) checking spacing limits between said first and second fixture jaw; and (f) determining whether fixture designs achieving form closure fall within said spacing limits so that a set of admissible fixture designs is obtained.

53. A modular fixturing system, comprising:

a fixture vice;

at least first, second, third, and fourth locators;

first and second fixture jaws disposed on said fixture vice, at least one of said first and second fixture jaws being movable in a planar direction with respect to one another, said first and second fixture jaws including an array of holes separated by a predetermined distance for receiving said at least first, second, third and fourth locators therein to contact a workpiece; and a fixture processor for generating, without human assistance, a set of admissible fixture designs which provide form closure based on geometric access constraints of the workpiece.

* * * * *